(12) United States Patent
Navarrete Michelini et al.

(10) Patent No.: US 11,328,184 B2
(45) Date of Patent: May 10, 2022

(54) IMAGE CLASSIFICATION AND CONVERSION METHOD AND DEVICE, IMAGE PROCESSOR AND TRAINING METHOD THEREFOR, AND MEDIUM

(71) Applicant: BOE TECHNOLOGY GROUP CO., LTD., Beijing (CN)

(72) Inventors: Pablo Navarrete Michelini, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 124 days.

(21) Appl. No.: 16/487,885

(22) PCT Filed: Oct. 31, 2018

(86) PCT No.: PCT/CN2018/113115
§ 371 (c)(1),
(2) Date: Aug. 22, 2019

(87) PCT Pub. No.: WO2019/091318
PCT Pub. Date: May 16, 2019

(65) Prior Publication Data
US 2020/0057921 A1    Feb. 20, 2020

(30) Foreign Application Priority Data
Nov. 9, 2017   (CN) .......................... 201711100238.1

(51) Int. Cl.
*G06K 9/62* (2022.01)
*G06T 9/00* (2006.01)

(52) U.S. Cl.
CPC ......... *G06K 9/6267* (2013.01); *G06K 9/6262* (2013.01); *G06T 9/002* (2013.01)

(58) Field of Classification Search
None
See application file for complete search history.

(56) References Cited

U.S. PATENT DOCUMENTS 10,289,910 B1 * 5/2019 Chen .................... G06K 9/4628
10,402,700 B2 * 9/2019 van den Oord .......... G06K 9/66
(Continued)

FOREIGN PATENT DOCUMENTS

CN    103116766 B    11/2015
CN    106845418 A     6/2017
(Continued)

OTHER PUBLICATIONS

Badrinarayanan, Vijay, Ankur Handa, and Roberto Cipolla. "Segnet: A deep convolutional encoder-decoder architecture for robust semantic pixel-wise labelling." arXiv preprint arXiv:1505.07293 (2015). (Year: 2015).*

(Continued)

*Primary Examiner* — Andrae S Allison
(74) *Attorney, Agent, or Firm* — Leason Ellis LLP

(57) ABSTRACT

Disclosed are an image classification and conversion method, apparatus, image processor and training method thereof, and medium. The image classification method includes receiving a first input image and a second input image; performing image encoding on the first input image by utilizing n stages of encoding units connected in cascades to produce a first output image, wherein n is an integer greater than 1, and wherein as for 1≤i<n, the output of the i-th stage of encoding unit is an input of an (i+1)-th stage of encoding unit, wherein m is an integer greater than 1; outputting a first output image, the first output image comprising m" output sub-images, and each of the m" output sub-images is corresponding to an image category.

18 Claims, 18 Drawing Sheets

(56) References Cited

U.S. PATENT DOCUMENTS

| | | | |
|---|---|---|---|
| 10,515,435 | B2 | 12/2019 | Navarrete Michelini et al. |
| 10,834,425 | B2* | 11/2020 | Navarrete Michelini ................... G06K 9/6262 |
| 2010/0316283 | A1* | 12/2010 | Greer ................ G06N 3/04 382/155 |
| 2016/0062947 | A1* | 3/2016 | Chetlur ................ G06F 17/153 708/420 |
| 2017/0200078 | A1* | 7/2017 | Bichler ................ G06N 3/049 |
| 2018/0046903 | A1* | 2/2018 | Yao ................ G06N 3/082 |
| 2018/0082181 | A1* | 3/2018 | Brothers ................ G06N 3/0454 |
| 2018/0096226 | A1* | 4/2018 | Aliabadi ................ G06N 3/10 |
| 2018/0129893 | A1* | 5/2018 | Son ................ G06N 3/063 |
| 2018/0197037 | A1 | 7/2018 | Navarrete Michelini et al. |
| 2018/0197067 | A1* | 7/2018 | Mody ................ G06N 3/063 |
| 2018/0293706 | A1* | 10/2018 | Viswanathan ........ G06T 3/4053 |
| 2018/0315154 | A1* | 11/2018 | Park ................ G06K 9/00973 |
| 2018/0350110 | A1* | 12/2018 | Cho ................ G06T 9/004 |
| 2019/0014320 | A1 | 1/2019 | Navarrete Michelini et al. |
| 2019/0251360 | A1* | 8/2019 | Cricri ................ G06N 3/0445 |

FOREIGN PATENT DOCUMENTS

| | | |
|---|---|---|
| CN | 107895174 A | 4/2018 |
| CN | 105809182 B | 12/2019 |
| EP | 2833295 A2 | 2/2015 |
| EP | 2977933 A1 | 1/2016 |
| WO | 2016100717 A1 | 6/2016 |
| WO | 2018205676 A1 | 11/2018 |

OTHER PUBLICATIONS

Kuga, Ryohei, et al. "Multi-task learning using multi-modal encoder-decoder networks with shared skip connections." Proceedings of the IEEE International Conference on Computer Vision Workshops. 2017. (Year: 2017).*

Simonyan et al. "Very Deep Convolutional Networks for Large-Scale Image Recognition." arXiv:1409.1556v6. Apr. 10, 2015. 14 pages.

Sweldens. "The Lifting Scheme: A Construction of Second Generation Wavelets." Lucent Technologies, Bell Laboratories. Jul. 1995 (and revised Nov. 1997). 35 pages.

Extended European Search Report for corresponding European Application No. 18875950.0, dated Jul. 2, 2021. 10 pages.

Sarlashkar A N et al, "Feature extraction using wavelet transform for neural network based image classification", System Theory, 1998. Proceedings of the Thirtieth Southeastern Symposi Um on Morgantown, WV, USA Mar. 8-10, 1998, New York, NY, USA,IEEE, US, (Mar. 8, 1998), doi:10.1109/SSST.1998.660107, ISBN 978-0-7803-4547-8, pp. 412-416. 5 pages.

Hou Xianxu et al, "Deep Feature Consistent Deep Image Transformations: Downscaling, Decolorization and HDR Tone Mapping", (Jul. 29, 2017), pp. 1-12, URL: https://arxiv.org/pdf/1707.09482.pdf, (Jun. 8, 2021), XP055811838 [A] 1-15. Jul. 29, 2017, pp. 1-12. Retrieved from the internet: URL: https://arxiv.org/pdf/1707.09482.pfd. 12 pages.

* cited by examiner

1400

- S1402: receiving the first encoded input component, the second encoded input component, the third encoded input component and the fourth encoded input component

- S1404: generating a prediction image based on the first encoded input component and the second encoded input component and acquiring a difference image of the third encoded input component and the fourth encoded input component, and the prediction image

- S1406: generating an update image relating to the first encoded input component and the second encoded input component based on the difference image, the first encoded input component and the second encoded input component

- S1408: performing a wavelet transform based on the update image, and generating a first encoded output component and a second encoded output component based on a result of the wavelet transform

- S1410: performing a wavelet transform based on the difference image, and generating a third encoded output component and a fourth encoded output component based on a result of the wavelet transform

```
generating a third prediction feature by utilizing a second     ─ S1602
prediction convolutional network which takes the first adding
              feature as an input
```

```
performing a subtraction operation on the second adding       ─ S1604
feature and the third prediction feature to obtain the second
              encoded output component
```

```
generating a third update feature by utilizing a second update   ─ S1606
convolutional network which takes the second encoded output
              component as an input
```

```
performing an adding operation on the first adding feature and   ─ S1608
the third update feature to obtain the first encoded output
                    component
```

```
generating a fourth prediction feature by utilizing a third     ─ S1702
prediction convolutional network which takes the first
              difference feature as an input
```

```
performing a subtraction operation on the second difference    ─ S1704
feature and the fourth prediction feature to obtain the fourth
              encoded output component
```

```
generating a fourth update feature by utilizing a third update   ─ S1706
convolutional network which takes the fourth encoded output
              component as an input
```

```
performing an adding operation on the first difference feature   ─ S1708
and the fourth update feature to obtain the third encoded
                    output component
```

- receiving an input image, the input image comprising $m^n$ image components — S1802
- performing image decoding on the input image by utilizing n stages of decoding units connected in cascades to produce a restored image, wherein as for $1 \leq i < n$, an input of an i-th stage of decoding unit is an i-th stage of decoded input image and comprises $m^i$ image components, an output of the i-th stage of decoding unit is an i-th stage of decoded output image and comprises $m^{i-1}$ image components, and the output of the i-th stage of decoding unit is an input of an (i+1)-th stage of decoding unit — S1804
- outputting a restoration image corresponding to the input image — S1806

- receiving an i-th stage of decoded input image — S1902
- performing an image inverse transform on the $m^i$ image components, to generate $m^i$ decoded output components corresponding to the i-th stage of decoded input image — S1904
- composing the $m^i$ decoded output components to $m^{i-1}$ decoded output sub-images — S1906
- outputting the $m^{i-1}$ decoded output sub-images corresponding to the $m^i$ image components of the i-th stage of decoded input image as the i-th stage of decoded output image — S1908

Fig. 19

IMAGE CLASSIFICATION AND CONVERSION METHOD AND DEVICE, IMAGE PROCESSOR AND TRAINING METHOD THEREFOR, AND MEDIUM

CROSS-REFERENCE TO RELATED APPLICATION

This application is a U.S. National Stage Application under 35 U.S.C. § 371 of International Patent Application No. PCT/CN2018/113115, filed Oct. 31, 2018, which claims the benefit of priority to Chinese patent application No. 201711100238.1 filed on Nov. 9, 2017, both of which are incorporated by reference in their entireties.

TECHNICAL FIELD

The present disclosure relates to a field of image processing, in particular to an image classification method, an image classification apparatus, an image conversion method, an image processor comprising the image classification apparatus and an image restoration apparatus and a training method thereof and a medium.

BACKGROUND

Based on the existing image classification method, an input image can be analyzed and a tag used for the input image is output. This tag represents an image category of the input image. However, information on the image category can be obtained according to the existing image classification method, while image pixel information corresponding to its category in the input image cannot be obtained.

SUMMARY

In view of the above problems, there are provided in the present disclosure a new method and apparatus for classifying and converting an image, an image processor and a training method thereof and a medium.

According to one aspect of the present disclosure, there is provided an image classification method comprising: receiving an input image; performing image encoding on the input image by utilizing n stages of encoding units connected in cascades to produce an output image, wherein n is an integer greater than 1, and wherein as for 1 an input of an i-th stage of encoding unit is an i-th stage of encoded input image and comprises image components, an output of the i-th stage of encoding unit is an i-th stage of encoded output image and comprises $m^i$ image components, and the output of the i-th stage of encoding unit is an input of an (i+1)-th stage of encoding unit, wherein m is an integer greater than 1; outputting the output image, wherein the output image comprises $m''$ output sub-images, the $m''$ output sub-images are corresponding to $m''$ output image components of an n-th stage of encoding unit, and each of the $m''$ output sub-images is corresponding to an image category; acquiring a pixel value of each of the $m''$ output sub-images in the output image, and determining according to the pixel value that at least one of the $m''$ output sub-images is a category sub-image of the input image, and determining a category of the input image as an image category corresponding to the category sub-image.

According to another aspect of the present disclosure, there is provided an image classification apparatus, comprising: an input terminal, configured to receive an input image; n stages encoding units connected in cascaded, configured to perform image encoding on the input image to produce an output image, wherein n is an integer greater than 1, and wherein as for 1≤i<n, an input of an i-th stage of encoding unit is an i-th stage of encoded input image and includes $mi-1$ image components, an output of the i-th stage of encoding unit is an i-th stage of encoded output image and includes mi image components, and the output of the i-th stage of encoding unit is an input of an (i+1)-th stage of encoding unit, wherein m is an integer greater than 1; an output terminal, configured to output the output image, wherein the output image comprises $m''$ output sub-images, the $m''$ output sub-images are corresponding to $m''$ output image components of an n-th stage of encoding unit, and each of the $m''$ output sub-images is corresponding to an image category; a classification unit, configured to acquire a pixel value of each of the $m''$ output sub-images in the output image, and determine according to the pixel value that at least one of the $m''$ output sub-images is a category sub-image of the input image, and determine a category of the input image as an image category corresponding to the category sub-image.

According to another aspect of the present disclosure, there is provided an image processor, comprising: an image encoding apparatus, the image encoding apparatus including: an encoded input terminal, configured to receive an input image; n stages of encoding units connected in cascades, configured to perform image encoding on the input image to produce an output image, wherein n is an integer greater than 1, and wherein as for 1≤i<n, an input of an i-th stage of encoding unit is an i-th stage of encoded input image and comprises $m^{-1}$ image components, an output of the i-th stage of encoding unit is an i-th stage of encoded output image and comprises $m^i$ image components, and the output of the i-th stage of encoding unit is an input of an (i+1)-th stage of encoding unit, wherein m is an integer greater than 1; an encoded output terminal, configured to output the output image, wherein the output image comprises $m''$ output sub-images, the $m''$ output sub-images are corresponding to $m''$ output image components of an n-th stage of encoding unit, and each of the $m''$ output sub-images is corresponding to an image category; an image decoding apparatus, the image decoding apparatus including: a decoded input terminal, configured to receive a decoded input image, the decoded input image including $m''$ image components, wherein m is an integer greater than 1, and n is an integer greater than 1; n stages of decoding units connected in cascades, configured to perform image decoding on the decoded input image to produce a restoration image, wherein n is an integer greater than 1, and wherein as for 1≤i<n, an input of an i-th stage of decoding unit is an i-th stage of decoded input image and comprises $m^{i-1}$ image components, an output of the i-th stage of decoding unit is an i-th stage of decoded output image and comprises $m^i$ image components, and the output of the i-th stage of decoding unit is an input of an (i+1)-th stage of decoding unit; a decoded output terminal, configured to output a restoration image corresponding to the decoded input image.

According to another aspect of the present disclosure, there is provided a training method used for the above mentioned image processer, comprising: inputting a training image to the image processor, adjusting weight values of respective convolutional networks in respective convolutional layers in the n stages of decoding unit and the n stages of decoding units, and running a limited number of iterations so as to optimize a target function.

According to another aspect of the present disclosure, there is provided a computer readable medium, upon which instructions are stored, and enables a computer to execute steps of: receiving an input image; performing image encoding on the input image by utilizing n stages of encoding units connected in cascades to produce an output image, wherein n is an integer greater than 1, and wherein as for $1 \leq i < n$, an input of an i-th stage of encoding unit is an i-th stage of encoded input image and comprises $m^{i-1}$ image components, an output of the i-th stage of encoding unit is an i-th stage of encoded output image and comprises $m^i$ image components, and the output of the i-th stage of encoding unit is an input of an (i+1)-th stage of encoding unit, wherein m is an integer greater than 1; outputting the output image, wherein the output image comprises $m^n$ output sub-images, the $m^n$ output sub-images are corresponding to $m^n$ output image components of an n-th stage of encoding unit, and each of the $m^n$ output sub-images is corresponding to an image category; acquiring a pixel value of each of the $m^n$ output sub-images in the output image, and determining according to the pixel value that at least one of the $m^n$ output sub-images is a category sub-image of the input image, and determining a category of the input image as an image category corresponding to the category sub-image.

According to another aspect of the present disclosure, there is provided an image conversion method, comprising: receiving a first input image and a second input image; performing image encoding on the first input image by utilizing n stages of encoding units connected in cascades to produce a first output image, wherein n is an integer greater than 1, and wherein as for $1 \leq i < n$, an input of an i-th stage of encoding unit is an i-th stage of encoded input image and includes image components, an output of the i-th stage of encoding unit is an i-th stage of encoded output image and includes $m^i$ image components, and the output of the i-th stage of encoding unit is an input of an (i+1)-th stage of encoding unit, wherein m is an integer greater than 1; outputting a first output image, the first output image comprising $m^n$ output sub-images, wherein the $m^n$ output sub-images are corresponding to $m^n$ output image components of an n-th stage of encoding unit respectively, and each of the $m^n$ output sub-images is corresponding to an image category; acquiring a pixel value of each of the $m^n$ output sub-images in the first output image, and determining according to the pixel value that at least one of the $m^n$ output sub-images is a category sub-image of the first input image; determining that a category of the first input image is an image category corresponding to the category sub-image; acquiring pixel information of the category sub-image; performing an image transform on the second input image based on the pixel information of the category sub-image, and transforming the second input image into a third image corresponding to the image category of the first input image.

The embodiments of the present disclose several configurations of the image classification apparatus and the image classification method which use a convolutional network to classify images and obtain pixel information corresponding to the category in the images. The image classification apparatus according to the embodiments of the present disclosure can utilize benefits of development and performance of the latest depth learning to classify the input image, and extract the pixel information corresponding to the category in the input image. Further, the pixel information corresponding to the category can be used to perform image category conversion on other images.

BRIEF DESCRIPTION OF THE DRAWINGS

In order to describe technical solutions of embodiments of the present disclosure clearly, accompanying figures needed to be used in description of the embodiments will be described briefly. Obviously, the figures in the following description are just some embodiments of the present disclosure, for those ordinary skilled in the art, other figures can be obtained according to these figures without paying any creative labor. The following figures are not purposely drawn by scaling in proportion according to the actual dimensions, because the key point is to show the substance and spirit of the present disclosure.

FIG. 14 shows a flowchart of an image transform process in an $i^{th}$-stage of transform encoding unit according to some embodiments of the present disclosure;

FIG. 16 shows a flowchart of a wavelet transform based on an updated image according to some embodiments of the present disclosure;

FIG. 17 shows a flowchart of a wavelet transform based on a difference image according to some embodiments of the present disclosure;

FIG. 18 shows a flowchart of an image restoring method according to some embodiments of the present disclosure;

FIG. 19 shows a flowchart of an image decoding method of an $i^{th}$ stage of transform decoding unit according to some embodiments of the present disclosure;

DETAILED DESCRIPTION

In order to make purposes, technical solutions and advantages of embodiments of the present disclosure more clearly, technical solutions in embodiments of the present disclosure will be described below clearly and completely by combining with the drawings of the embodiments of the present disclosure. The embodiments described herein are just a part of embodiments of the present disclosure, but not all the embodiments. Based on the embodiments of the present disclosure, all the other embodiments obtained by those ordinary skilled in the art without paying any inventive labor also belong to the scope sought for protection in the present disclosure.

Unless otherwise defined, technical terms or scientific terms used in the present disclosure shall have common meanings understood by those ordinary skilled in the art. "First", "second" and similar words used in the present disclosure do not indicate any sequence, quantity or importance, but they are just used to distinguish different components and parts. Also, "include", "comprise" and other similar words mean that an element or an object appearing prior to the word contains an element or an object or its equivalent listed subsequent to the word, but does not exclude other elements or objects. "Connect", "connected to" and other similar words are not limited to physical or mechanical connection, but can comprise electrical connection, regardless of direct connection or indirect connection.

Figure 1:
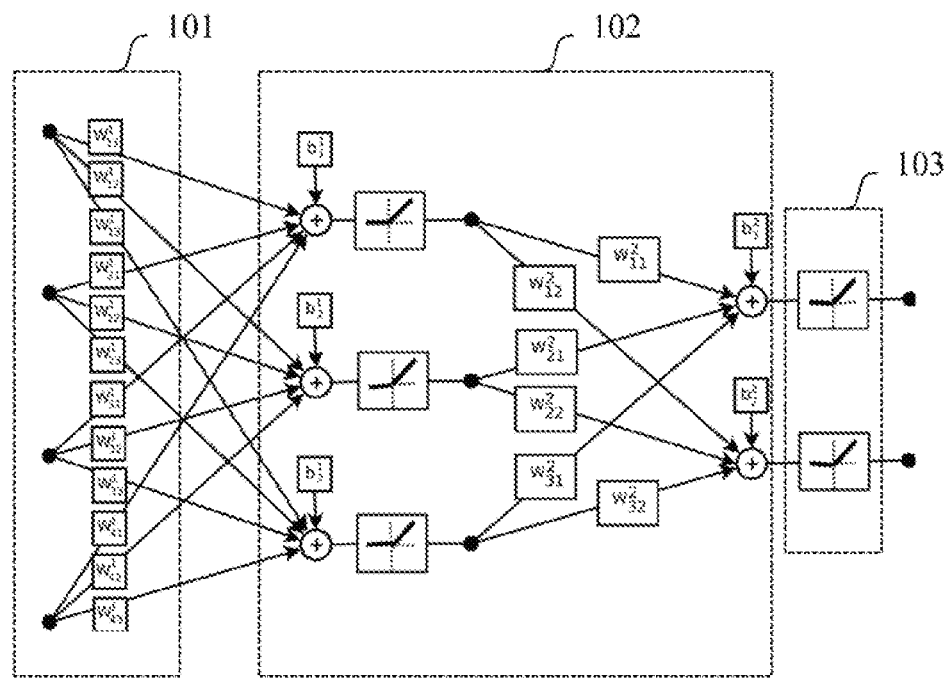
FIG. 1 is a schematic diagram illustrating a convolutional neural network for image processing.

A common network structure in depth learning is a convolutional neutral network. The convolutional neutral network is a neutral network structure which always uses an image as an input and used a convolutional kernel to take the place of a weight. As an example, a simple neutral network structure is shown in FIG. 1. FIG. 1 shows a simple schematic diagram of a convolutional neutral network. The convolutional neutral network is for example used for image processing, using an image as an input or an output, for example, replacing the weight with the convolutional kernel. FIG. 1 shows a convolutional neutral network with a simple structure. As shown in FIG. 1, the structure acquires 4 input images at four input terminals at the left side, has 3 units (output images) at a central hidden layer 102, and has 2 units at an output layer 103, to produce two output images. Each block having a weight $w_{ij}^{k}$ is corresponding to a convolutional kernel (for example, 3×3 or 5×5 kernel), wherein k is a tag indicating a serial number of an input layer, i and j are tags indicating an input unit and an output unit respectively. A bias $b_1^k$ is a scalar added to an output of convolution. Results of several convolutions and biases are added and then an activation function of an active layer is used. The activation function is generally corresponding to a rectifying linear unit (ReLU) or a sigmoid function or a hyperbolic tangent function, etc. The weight and bias of the convolutional kernel are fixed during the operation of the system, obtained by using a training process of a set of input/output exemplary images, and adjusted to be appropriate for some optimization standards depending on applications. A typical configuration relates to dozens of or hundreds of convolutional kernels in each layer.

Figure 2:
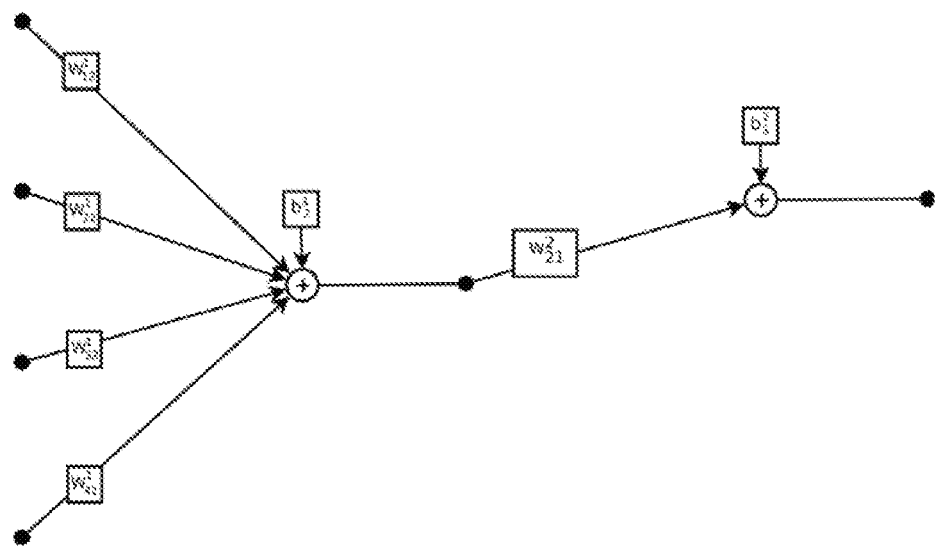
FIG. 2 is a schematic diagram illustrating a convolutional neutral network for image processing.

FIG. 2 shows an equivalent exemplary diagram due to an activation result of an activation function in the convolutional neutral network as shown in FIG. 1. Herein, as for a certain specific input, it is assumed that only its output of a second ReLU (corresponding to a node to which a bias $b_2^1$ points in FIG. 2) in a first layer and output of a first ReLU (corresponding to a node to which a bias $b_1^2$ points in FIG. 2) in a second layer is greater than 0. As for the specific input, the input to other ReLUs are 0, and thus can be omitted in FIG. 2.

The present disclosure introduces a method of applying a depth learning network to image classification. The image classification herein is invertible. For example, images including handwritten numerals can be classified into 10 categories: 0, 1 . . . 9. The system provided in the present disclosure can output a plurality of (for example, 10) low resolution images called as latent space, of which only one image would display a number. This number is a correct number corresponding to the input image. Images in the latent space may be images having a lower resolution relative to the input image. Although there are many systems used to solve the classification problem, in the present disclosure, these low-resolution outputs can be utilized and decoded to restore an original input image. In this kind of scenario, people can operate outputs of the classification for different purposes. One application is to combine latent space information to convert images corresponding to one category into another category. For example, people can convert an image of one number into an image of another number, or convert an image of one man into an image of one woman, or convert an image of a dog into an image of a cat, and meanwhile reserve all the other features having nothing to do with the category.

Figure 3:
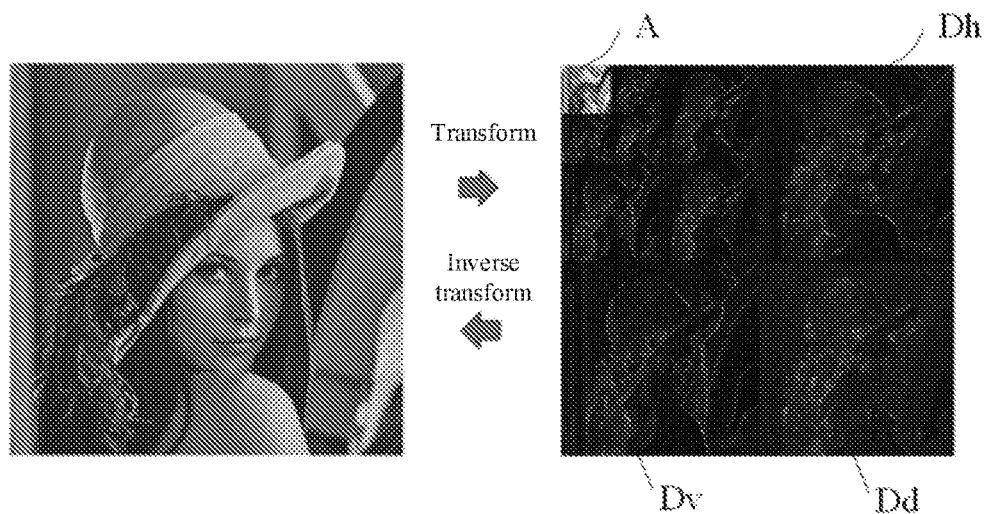
FIG. 3 is a schematic diagram illustrating a wavelet transform for multi-resolution image transform.

FIG. 3 is a schematic diagram illustrating a wavelet transform for multi-resolution image transform. The wavelet transform is a multi-resolution image transform used for image encoding/decoding processing, whose application includes transform encoding in JPEG 2000 standard. In an image encoding processing, the wavelet transform is used to represent an original high-resolution image with a smaller low-resolution image (for example, a part of the original image). In the image decoding processing, an inverse wavelet transform is used to utilize the low-resolution image and difference features required for restoring the original image, to restore and obtain the original image.

FIG. 3 schematically shows 3 stages of wavelet transforms and inverse transforms. As shown in FIG. 3, one of the smaller low-resolution images is a reduced version A of the original image, while other low-resolution images represent details (Dh, Dv and Dd) needed for restoring the original image.

Figure 4:
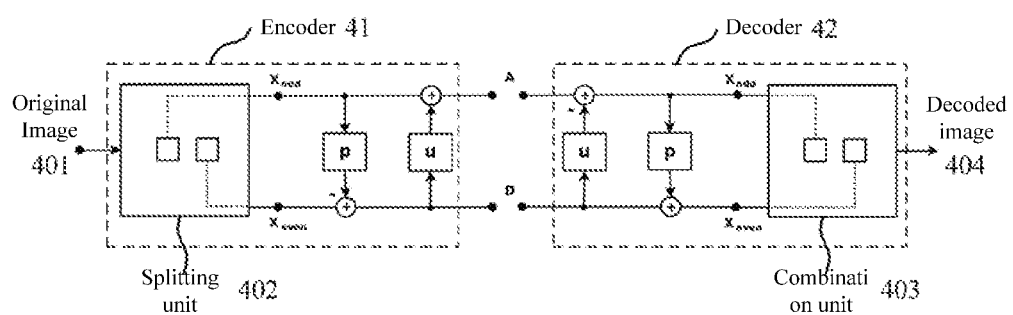
FIG. 4 is a structure schematic diagram of an image processor that utilizes a convolutional neutral network to realize a wavelet transform.

FIG. 4 is a schematic diagram of a structure of an image processor realizing the wavelet transform by utilizing a convolutional neutral network. Lifting scheme is an effective implementation of the wavelet transform and is a flexible tool for constructing wavelets. FIG. 4 schematically shows a standard structure for one-dimensional data. The left side of FIG. 4 is an encoder 41. A T-MUXOUT unit 402 in the encoder 41 transforms an input original image 401 into a low-resolution image A and a detail D. In particular, the encoder 41 uses a prediction filter p and an update filter u. As for a compression application, it is desired that the detail D is about 0, so that most of the information is contained in the image A. The right side of FIG. 4 is a decoder 42. Parameters of the decoder 42 may be completely the same as filters p and u from the encoder 42, but only that the filters p and u are disposed inversely. Since the encoder 41 and the decoder 42 are strictly corresponding, such configuration ensures that a decoded image 404 obtained by combination of a combination unit 403 of the decoder 42 are completely the same as an original image 401. Additionally, the structure as shown in FIG. 4 is not limited, and alternatively, it can be configured in a sequence where the encoder and the decoder exchange the update filter u and the prediction filter p. In the present disclosure, the update filter u and the prediction filter p can be implemented by using the convolutional neutral network as shown in FIG. 1.

An image classification apparatus, an image restoring apparatus, an image processor including the image classification apparatus and the image restoring apparatus, corresponding image classification method, image restoring method and training method for configuring the image processor according to embodiments of the present disclosure will be further described below by referring to the figures.

Figure 5:
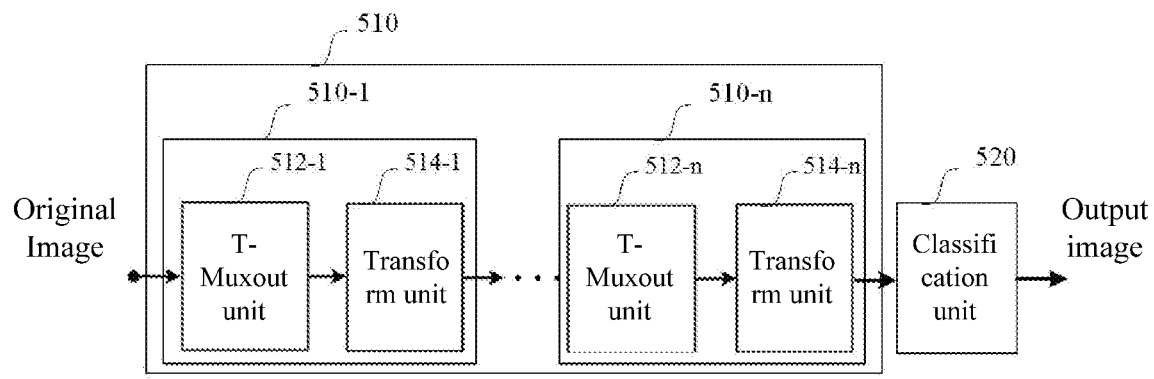
FIG. 5 shows a schematic diagram of an image classification apparatus according to some embodiments of the present disclosure.

FIG. 5 shows a schematic diagram of an image classification apparatus according to some embodiments of the present disclosure. The image classification apparatus 500 comprises a transform encoding unit 510.

The transform encoding unit 510 can comprise an input terminal for receiving an encoded input image. The input image may be an image including only a single channel (such as R, G, B or grey scale, etc.), or may be an image including any number of channels (such as R, G B and grey scale, etc.).

The transform encoding unit 510 can further comprise n stages of encoding units 510-1, 510-2, . . . 510-n connected in cascades, where n is an integer greater than or equal to 1. For 1≤i<n, an input of an i-th stage of encoding unit is an i-th stage of encoded input image including $m^{i-1}$ image components, an output of the i-th stage of encoding unit is an i-th stage of encoded output image including $m^i$ image components, and the output of the i-th stage of encoding unit is an input of an (i+1)-th stage of encoding unit, where m is an integer greater than 1.

In some embodiments, each of n stages of encoding units connected in cascades can comprise a T-MUXOUT unit 512 and a transform unit 514. That is to say, an i-th stage of encoding unit 510-i comprises a T-MUXOUT unit 512-i, and a transform unit 514-i. The T-MUXOUT unit 512-i is used to perform T-MUXOUT operation on each of $m^{i-1}$ image components received by the i-th stage of encoding unit, and split each image component in the i-th stage of encoded input image into m image components, i.e., transforming $m^{i-1}$ image components in the i-th stage of encoded input image into $m^i$ image components.

The transform encoding unit 510 can further comprise an output terminal used to output an encoded output image, wherein the encoded output image includes $m^n$ output image components corresponding to the encoded input image, i.e., $m^n$ output sub-images, and each of the $m^n$ output sub-images is corresponding to one image category.

The image classification apparatus 500 can further comprise a classification unit 520 configured to acquire a pixel value of each of the $m^n$ output sub-images in the encoded output image, and determine according to the pixel value that at least one of the $m^n$ output sub-images is a category sub-image of the input image and determine that the category of the input image is an image category corresponding to the category sub-image. The pixel value mentioned herein can be a sum of pixel values of all pixels in the image. In the following text, the sum of the respective pixel values in the image can be referred to as the pixel value of the image for short. In some embodiments, the classification unit 520 can be configured to compare the pixel value of each of $m^n$ output sub-images with a first threshold, determine an output sub-image having a pixel value greater than the first threshold as a category sub-image, and output a category tag corresponding to the category sub-image, wherein the category sub-circuit comprises pixel information corresponding to the category tag in the input image.

The transform encoding unit is capable of splitting the input image and transforming the image, and extracting a plurality of image components in the image as an output. Each of the outputted images is corresponding to a category of image classification. The category of the input image can be determined according to pixel values of the plurality of image components output by the image classification apparatus. In some embodiments, after being processed by the image classification apparatus, a pixel value of at least one output sub-image of a plurality of output sub-images in the output image is not zero, while pixel values of other output sub-images are close to zero. Then, it can be considered that the output sub-images having pixel values of non-zero represent the category of the input image. For example, if the output image comprises 4 output sub-images $C_0$ (REF), $C_1$, $C_2$, $C_3$, and if the pixel value of $C_1$ is not zero while the pixel values of $C_0$, $C_2$, $C_3$ are close to zero, then the category of the input image is determined as a category $C_1$. Specific image features of the category $C_1$ is determined by the configuration of the image classification apparatus. After configuration of a training method to be introduced below, the output sub-image outputted after being encoded and transformed represents category information of the input image and pixel information corresponding to the category information.

For example, $C_0$, $C_1$, $C_2$, $C_3$ can represent numbers 0, 1, 2, 3. If the input image of the image classification apparatus includes an image of a number 0, the pixel value of $C_0$ among the 4 output sub-images output by the image classification apparatus is not zero, while the pixel values of $C_1$, $C_2$, $C_3$ are close to zero. Furthermore, the pixel information of $C_0$ can represent the pixel information of the number 0 in the input image, such as a shape, size, and position of the image of the number 0, for example, if the upper left corner of the input image has an image of the number 0, then the upper left corner of the output sub-image $C_0$ has the pixel information corresponding to the number 0 included in the input image. If the input image of the image classification apparatus comprises images of a number 0 and a number 2 simultaneously, the pixel values of $C_0$ and $C_2$ in the 4 output sub-images are not zero, while the pixel values of $C_1$ and $C_3$ are close to zero. Furthermore, the pixel information of $C_0$ can represent the pixel information of the number 0 in the input image, such as a shape, size, and position of the image of the number 0. The pixel information of $C_2$ can represent the pixel information of the number 2 in the input image, such as a shape, size, and position of the image of the number 2. For example, if the upper left corner of the input image of the image classification apparatus has the image of the number 0 and the below right corner thereof has the image of the number 2, then the upper left corner of the output sub-image $C_0$ has the pixel information corresponding to the number 0 included in the input image, and the below right corner of the output sub-image $C_2$ has the pixel information corresponding to the number 0 included in the input image.

For another example, $C_0$, $C_1$, $C_2$, $C_3$ can represent man, woman, cat, dog respectively. Then, similarly, if the input image includes a man and a dog, among the 4 output sub-images, pixel values of $C_0$, $C_3$ are not zero while the pixel values of $C_1$, $C_2$ are close to zero. Furthermore, the pixel information of $C_0$ can represent the pixel information about the man in the input image, and the pixel information of $C_2$ can represent the pixel information about the dog in the input image.

That is to say, a trained image classification apparatus is capable of classifying the input image and extracting the corresponding category information. If the input image comprises image information that conforms to a plurality of categories, the image classification apparatus would output sub-images of a plurality of corresponding categories, and the output sub-images comprise the pixel information corresponding to each category in the input image.

The pixel information corresponding to the image category and extracted through the above classification process is capable of being further used for image conversion. The process of image conversion will be further described below by referring to FIGS. 8-10.

Figure 6:
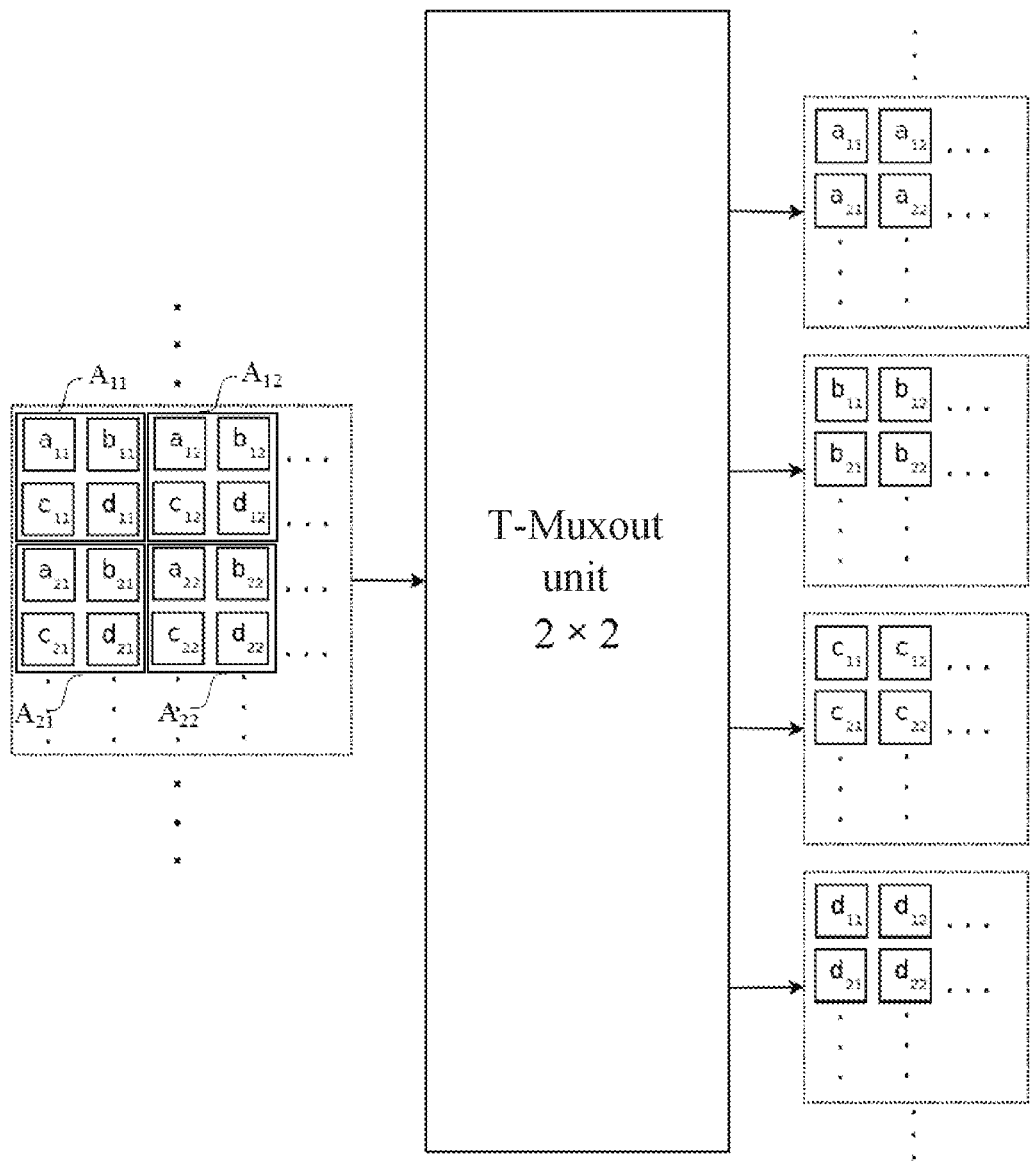
FIG. 6 illustrates a schematic diagram of a T-MUXOUT unit according to some embodiments of the present disclosure.

FIG. 6 exemplarily shows a T-MUXOUT unit 512 being capable of splitting one piece of image into 4 small lower-resolution images. As shown in FIG. 6, the T-MUXOUT unit T-MUXOUT can divide the original image by taking a 2×2 basic pixel matrix as a unit, of which each basic pixel matrix comprises 4 original pixels. The T-MUXOUT unit 512 further extracts all pixels at specific positions in the divided 2×2 basic pixel matrix, and determines split images according to the pixels at specific positions in each basic pixel matrix. For example, as shown in FIG. 6, the input image of the T-MUXOUT unit 512 comprises 16 original images, and the T-MUXOUT unit 512 divides the input image into basic pixel matrixes $A_{11}$, $A_{12}$, $A_{21}$, $A_{22}$, of which the basic pixel matrix $A_{11}$ includes pixels $a_{11}$, $b_{11}$, $c_{11}$, $d_{11}$, the basic pixel matrix $A_{12}$ includes pixels $a_{12}$, $b_{12}$, $c_{12}$, $d_{12}$, the basic pixel matrix $A_{21}$ includes pixels $a_{21}$, $b_{21}$, $C_{21}$, $d_{21}$, and the basic pixel matrix $A_{22}$ includes pixels $a_{22}$, $b_{22}$, $c_{22}$, $d_{22}$. The T-MUXOUT unit 512 can extract the original pixels such as pixels $a_{11}$, $a_{12}$, $a_{21}$, $a_{22}$ as shown in FIG. 5 in the upper left corner (i.e., at the position of [1, 1]) in all basic pixel matrixes, and arrange the extracted pixels in a sequence of respective pixels arranged in the image before being split, to generate a first piece of low-resolution split image. Further, the T-MUXOUT unit 512 can extract the original pixels such as pixels $b_{11}$, $b_{12}$, $b_{21}$, $b_{22}$ as shown in FIG. 5 at the position of [1, 2] of all basic pixel matrixes, and arrange the extracted pixels in a sequence of respective pixels arranged in the image before being split, to generate a second piece of low-resolution split image. Similarly, the T-MUXOUT unit can generate other small low-resolution split images.

It can be understood that the T-MUXOUT unit as shown in FIG. 6 can split image of any size into 4 small lower-resolution images. In some embodiments, sizes of the plurality of low-resolution split images are equal. For example, the T-MUXOUT unit 512 as shown in FIG. 6 can split an image with an original size of 128×128 into 4 low-resolution images with a size of 64×64.

It can be understood that the T-MUXOUT unit as shown in FIG. 6 is just an example of the T-MUXOUT unit according to the principle of the present disclosure. In fact, the image can be split into a plurality of small images with lower resolution by adjusting sizes and shapes of the divided basic pixel matrixes. For example, if the size of the basic pixel matrix is 3×3, the T-MUXOUT unit can split the input image into 3×3=9 small images with lower resolution. For another example, if the size of the basic pixel matrix is 3×4, the T-MUXOUT unit can split the input image into 3×3=12 small images with lower-resolution. That is to say, if the size of the basic pixel matrix is a×b, the T-MUXOUT unit can split the input image into a×b=c small images with lower resolution. Those skilled in the art can know that according to the principle of the present disclosure, the T-MUXOUT unit 512 can split one piece of image into a plurality of compressed images with lower resolution arbitrarily.

It can be understood that FIG. 6 shows a schematic diagram of utilizing the T-MUXOUT unit to split two-dimensional image data. According to the principle of the present disclosure, the T-MUXOUT unit 512 can split any other dimensional (such as one-dimensional, three-dimensional, etc.) image data.

For the purpose of convenient description, the following text will be described by taking the T-MUXOUT unit as shown in FIG. 6 as an example, and the four low-resolution split images are referred to as upper left (UL), upper right (UR), below left (BL) and below right (BR). That is to say, for the i-th stage of encoding unit, the input image comprises $4^{i-1}$ image components, and the i-th stage of encoded input image is split into $4^i$ image components via the T-MUXOUT unit 512-i in the i-th stage of encoding unit.

Figure 7:
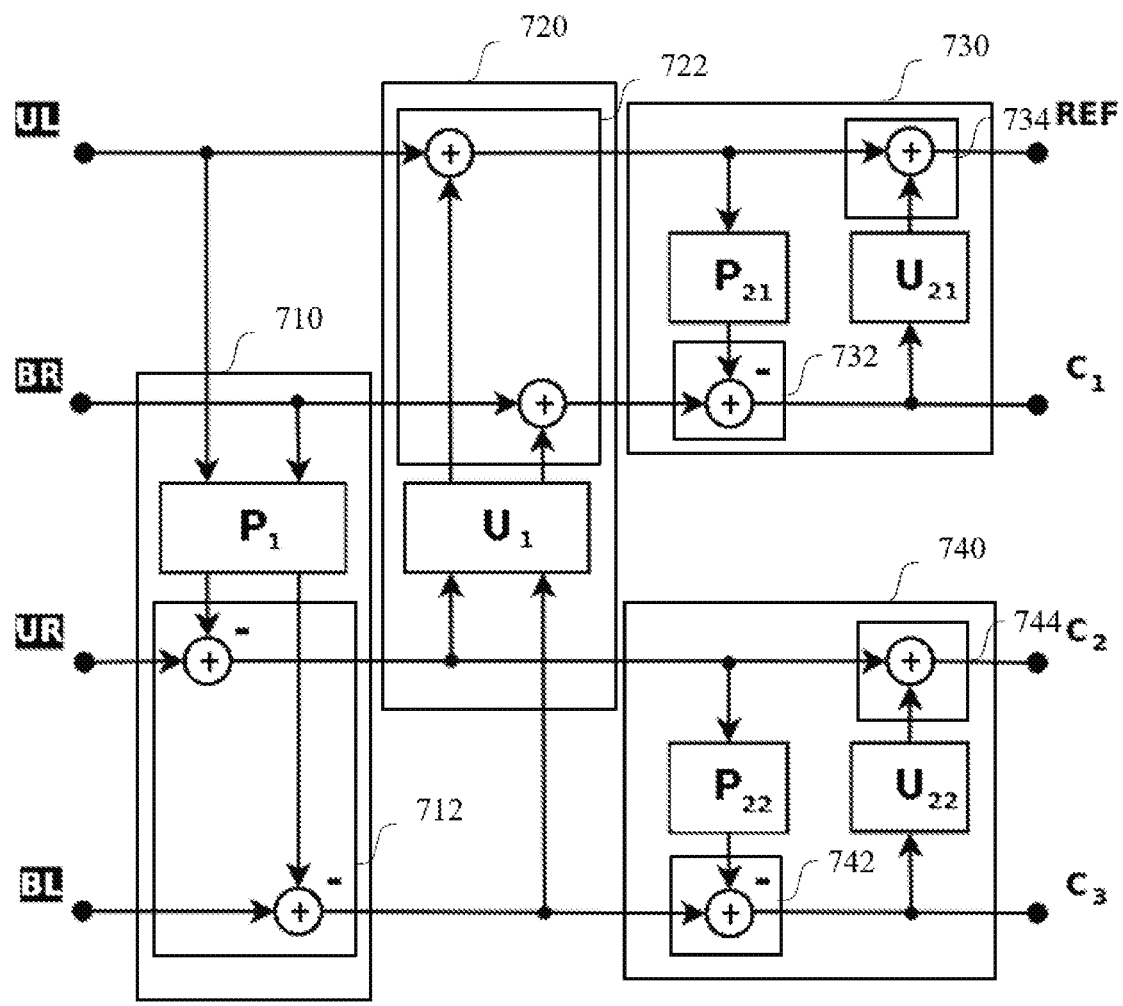
FIG. 7 illustrates a schematic diagram of a transform unit according to some embodiments of the present disclosure.

FIG. 7 illustrates a schematic diagram of a transform unit 514 according to some embodiments of the present disclosure. As described above, the T-MUXOUT unit can split the original image into 4 low-resolution images UL, UR, BL and BR. The transform unit 514 can perform an image transform on the above four low-resolution images UL, UR, BL and BR, so as to extract image components in the input image.

The transform unit 514 can comprise a first prediction unit 710, configured to generate a prediction image used for the UR image and the BL image based on the UL image and the BR image and acquire difference images between the UR image, the BL image and the prediction image, respectively; a first update unit 720, configured to generate an update image used for the UL image and the BR image based on the difference image between the UR image, the BL image and the prediction image; a first wavelet transform unit 730, configured to perform a wavelet transform based on the update image used for the UL image and the BR image, and generate a first encoded output component and a second encoded output component based on a result of the wavelet transform; a second wavelet transform unit 740, configured to perform a wavelet transform based on the difference image between the UR image, the BL image and the prediction image, and generate a third encoded output component and a fourth encoded output component based on the result of the wavelet transform.

In some embodiments, as shown in FIG. 7, the first prediction unit 710 can further comprise a first prediction convolutional network $P_1$ and a first subtraction unit 712. The first prediction unit $P_1$ is configured to receive the UL image and the BR image as an input, and generate a first prediction feature and a second prediction feature used for the UR image and the BL image. The first prediction feature and the second prediction feature may be the same, or may be different. The first subtraction unit 712 is configured to perform a subtraction operation on the UR image and the first prediction feature to obtain a first difference feature, and perform a subtraction operation on the BL image and the second prediction feature to obtain a second difference feature.

In some embodiments, the first update unit 720 can further comprise a first update convolutional network $U_1$ and a first adding unit 722. The first update convolutional network $U_1$ is configured to receive the first difference feature and the second difference feature as an input and generate a first update feature and a second update feature used for the UL image and the BR image. The first update feature and the second update feature may be the same, or may be different. The first adding unit 722 is configured to perform an adding operation on the UL image and the first update feature to obtain a first adding feature, and perform an adding operation on the BR image and the second update feature to obtain a second adding feature.

In some embodiments, the first wavelet transform unit 730 can further comprise a second prediction convolutional network $P_{21}$, configured to receive the first adding feature as an input and generate a third prediction feature used for the second adding feature; a second subtraction unit 732, configured to perform a subtraction operation on the second adding feature and the third prediction feature to obtain the second encoded output component; a second update convolutional network $U_{21}$, configured to receive the second encoded output component as an input and generate a third update feature used for the first encoded output component; a second adding unit 734, configured to perform an adding operation on the first adding feature and the third update feature to obtain the first encoded output component.

In some embodiments, the second wavelet transform unit 740 can further comprise a third prediction convolutional network $P_{22}$, configured to receive the first difference feature as an input and generate a fourth prediction feature used for the second difference feature; a third subtraction unit 742, configured to perform a subtraction operation on the second difference feature and the fourth prediction feature to obtain the fourth encoded output component; a third update convolutional network $U_{22}$, configured to receive the fourth encoded output component as an input and generate a fourth update feature used for the first difference feature; a third adding unit 644, configured to perform an adding operation on the first difference feature and the fourth update feature to obtain the third encoded output component.

The structure as shown in FIG. 7 is not limited. For example, the structures of the first prediction unit 710 and the first update unit 720 can be exchanged in the transform unit 514.

By utilizing the image processing apparatus as shown in FIG. 7, an image transform can be performed on the low-resolution split image and image components in the input image can be extracted. No image information is lost in the process of the image transform, and the image information can be restored through a corresponding inverse transform without any loss.

Figure 8:
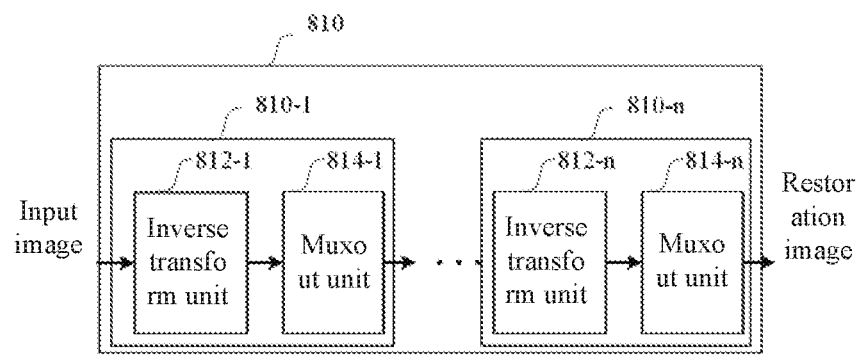
FIG. 8 shows a schematic diagram of an image restoring apparatus according to some embodiments of the present disclosure.

FIG. 8 shows a schematic diagram of an image restoring apparatus according to some embodiments of the present disclosure. The image restoring apparatus 800 can comprise a transform decoding unit 810.

The transform decoding unit 810 as shown in FIG. 8 is corresponding to the transform encoding unit as shown in FIG. 5, and can restore the image data transformed by the transform encoding unit 510 to the original data without any loss.

The transform decoding unit 810 can comprise an input terminal for receiving a decoded input image, and the decoded input image includes $m^n$ image components, where m is an integer greater than 1, and n is an integer greater than or equal to 1. Herein, each image component in the $m^n$ image components can comprise a plurality of channels (for example, the three channels RGB).

The transform decoding unit 810 can further comprise n stages of encoding units 810-1, 810-2 . . . 810-$n$ connected in cascades. As for 1≤i<n, an input of an i-th stage of decoding unit is an i-th stage of decoded input image and comprises $m^i$ image components, an output of the i-th stage of decoding unit is an i-th stage of decoded output image and comprises $m^{i-1}$ image components, and the output of the i-th stage of decoding unit is an input of an (i+1)-th stage of decoding unit.

In some embodiments, each of the n stages of decoding units connected in cascades can comprise an inverse transform unit 812 and a MUXOUT unit 814. That is to say, an i-th stage of decoding unit 810-$i$ comprises an inverse transform unit 812-$i$ and a MUXOUT unit 814-$i$. The inverse transform unit is configured to perform an inverse transform on the mi image components input by the i-th stage of decoding unit, so as to restore a restoration image corresponding to the mi image components included in the decoded input image. The MUXOUT unit 814 is configured to perform a combination operation on mi decoded output components after being inversely transformed, so as to combine the mi image components to the mi−1 image components.

The transform decoding unit 810 can comprise an output terminal, configured to output the restoration image corresponding to the $m^n$ image components in the decoded input image.

Figure 9:
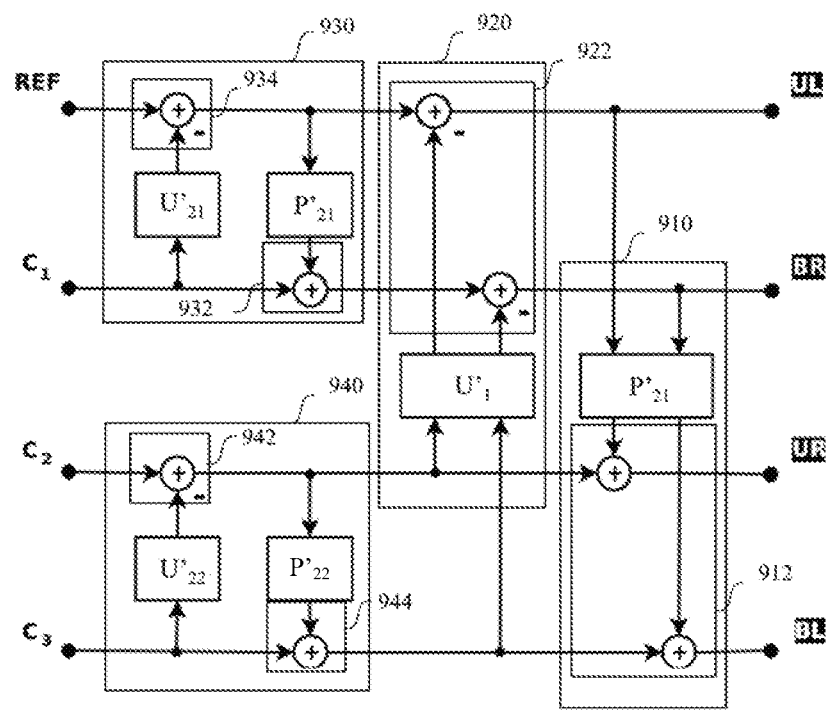
FIG. 9 shows a schematic diagram of an inverse transform unit according to some embodiments of the present disclosure.

FIG. 9 shows a schematic diagram of an inverse transform unit 812 according to some embodiments of the present disclosure. When m=4, the i-th stage of decoded input image comprises a first decoded input component, a second decoded input component, a third decoded input component and a fourth decoded input component, of which each decoded input component includes $4^{i-1}$ image components.

The inverse transform unit 812 can comprise a first inverse wavelet transform unit 930, configured to perform an inverse wavelet transform based on the first decoded input component and the second decoded input component, and obtain a first difference feature and a first adding feature based on a result of the inverse wavelet transform; a second inverse wavelet transform unit 940, configured to perform an inverse wavelet transform based on the third decoded input component and the fourth decoded input component, and obtain a second difference feature and a second adding feature based on a result of the inverse wavelet transform; a second update unit 920, configured to generate an update image based on the second difference feature and the second adding feature, and generate a first decoded output component and a second decoded output component based on the update image, the first different feature and the first adding feature; a second prediction unit 910, configured to generate a prediction image based on the first decoded output component and a second decoded output component, and generate a third decoded output component and a fourth decoded output component based on the prediction image, the second difference feature and the second adding feature.

In some embodiments, the second update unit 920 further comprises a first update convolutional network $U'_1$ and a first subtraction unit 922. The first update convolutional network $U'_1$ is configured to receive the second difference feature and the second adding feature as an input, and generate a first update feature and a second update feature for the second difference feature and the second adding feature. The first update feature and the second update feature may be the same, or may be different. The first subtraction unit 922 is configured to perform a subtraction operation on the first difference feature and the first update feature to obtain the first decoded output component, and perform a subtraction operation on the first adding feature and the second update feature to obtain the second decoded output component.

In some embodiments, the second prediction unit 910 further comprises a first prediction convolutional network $P'_1$ and a first adding unit 912. The first prediction convolutional network $P'_1$ is configured to receive the first decoded output component and the second decoded output component as an input, and generate a first prediction feature and a second prediction feature for the first decoded output component and the second decoded output component. The first prediction feature and the second prediction feature may be the same, or may be different. The first adding unit 912 is configured to perform an adding operation on the second difference feature and the first prediction feature to obtain the third decoded output component, and perform an adding operation on the second adding feature and the second prediction feature to obtain the fourth decoded output component.

In some embodiments, the first inverse wavelet transform unit 930 can further comprise a second update convolutional network $U'21$, configured to receive the second decoded input component as an input and generate a third update feature for the second decoded input component; a second subtraction unit 934, configured to perform a subtraction operation on the first decoded input component and the third update feature to obtain a first difference feature; a second prediction convolutional network $P'_{21}$, configured to receive the first difference feature as an input and generate the third prediction feature for the first difference feature; a second adding unit 932, configured to perform an adding operation on the second decoded input component and the third prediction feature to obtain the first adding feature.

In some embodiments, the second inverse wavelet transform 940 can further comprise a third update convolutional network $U'_{22}$, configured to receive the fourth decoded input component as an input and generate a fourth update feature for the fourth image decoded input; a third subtraction unit 942, configured to perform a subtraction operation on the third decoded input component and the fourth update feature to obtain the second difference feature; a third prediction convolutional network $P'_{22}$, configured to receive the second difference feature as an input and generate the fourth prediction feature for the second difference feature; a third adding unit 944, configured to perform an adding operation on the fourth decoded input component and the fourth prediction feature to obtain the second adding feature.

Since the inverse transform unit 812 can be configured to restore an image processed by the transform unit 514, in some embodiments, the convolutional network in the inverse transform unit 812 is completely corresponding to the convolutional network in the transform unit 514. That is to say, the first prediction convolutional network $P'_1$, the first update convolutional network $U'_1$, the second update convolutional network $U'_{21}$, the second prediction convolutional network $P'_{21}$, the third update convolutional network $U'_{22}$, and the third prediction convolutional network $P'_{22}$ in the inverse transform unit 812 have the same structures and configuration parameters as the first prediction convolutional network $P_1$, the first update convolutional network $U_1$, the second update convolutional network $U_{21}$, the second prediction convolutional network $P_{21}$, the third update convolutional network $U_{22}$, and the third prediction convolutional network $P_{22}$ in the transform unit 514.

The structure as shown in FIG. 9 is not limited. For example, structures of the second prediction unit 910 and the second update unit 920 can be exchanged in the inverse transform unit 812.

Figure 10:
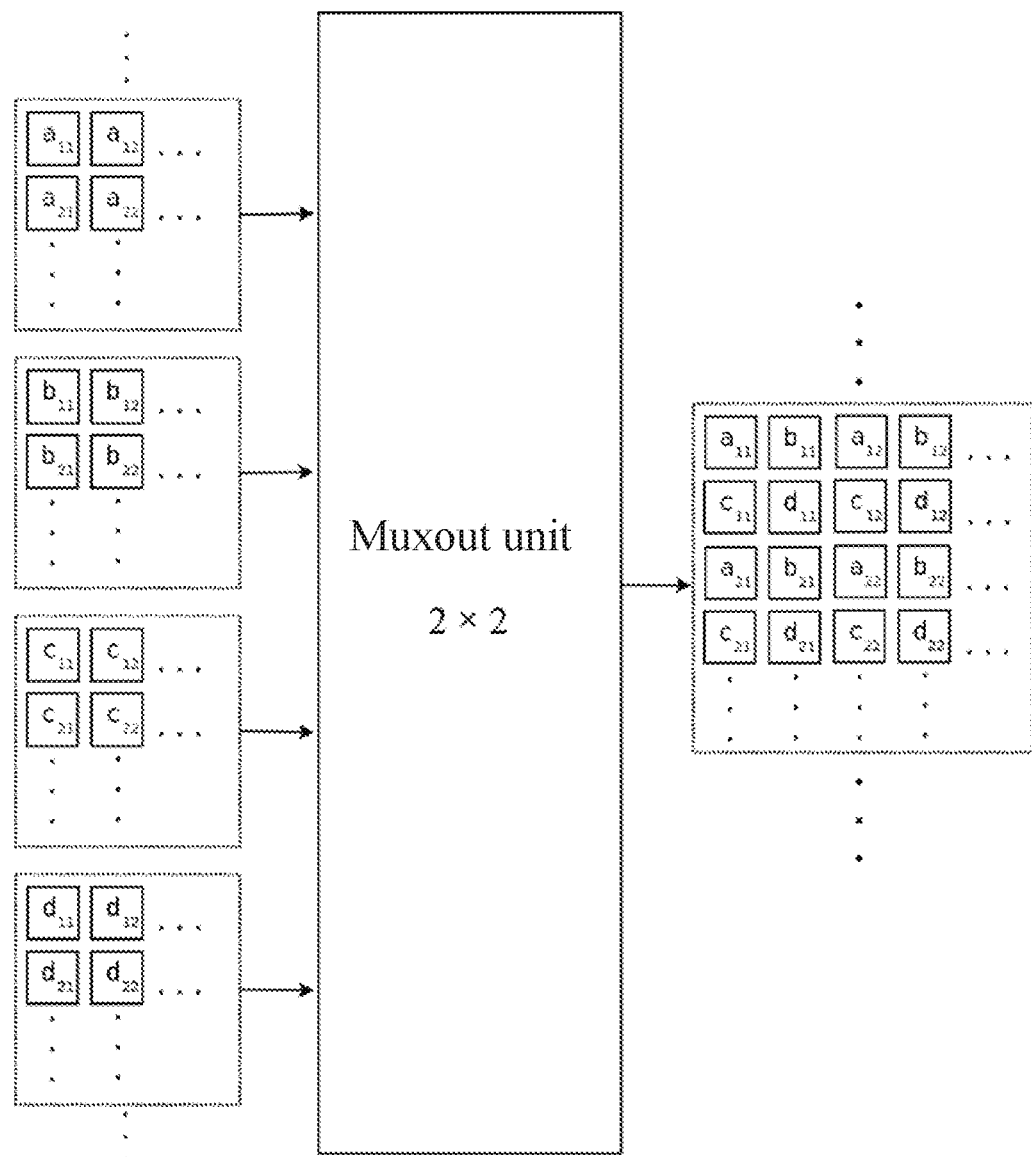
FIG. 10 shows a schematic diagram of a MUXOUT unit according to some embodiments of the present disclosure.

FIG. 10 shows a schematic diagram of a MUXOUT unit according to some embodiments of the present disclosure. The MUXOUT unit can combine a plurality of small low-resolution images to a higher-resolution combination image. The MUXOUT unit is configured to perform the inverse transform of the T-MUXOUT unit as described above, so as to restore the small low-resolution split images to high-resolution original images.

In some embodiments, if a plurality of output sub-images of the input image are obtained by the image classification apparatus, if the obtained output sub-images are input to the image restoring apparatus in a sequence of outputting, then the image restoring apparatus would output a restored input image. For example, the input image obtains output sub-images $C_0$ (REF), $C_1$, $C_2$, and $C_3$ after being processed by the image classification apparatus and if the output sub-images $C_0$ (REF), $C_1$, $C_2$, and $C_3$ are correspondingly input to the input terminal of the inverse transform unit, the MUXOUT unit would extract corresponding pixel points from the output sub-images in sequence, and arrange the extracted pixel points in sequence to generate restored images. After the inverse transform process and the combination operation described above, the image restoring apparatus would output restored images as the same as the input image.

In some other embodiments, if the output sub-images of the image classification apparatus are changed, and a plurality of changed output sub-images are input to the image restoring apparatus, then the image restoring apparatus would output a restored image different from the input image.

For example, if the upper left corner of the input image has the number 0 and the bottom right corner has the number 2, then $C_0$, and $C_2$ in the output sub-images obtained after being processed by the image classification apparatus would comprise the pixel information where the upper left corner has the number 0 and the bottom right corner has the number 2. In the process of restoring, if the pixel information of $C_0$ and $C_2$ are exchanged and input to the image restoring apparatus, then the image restoring apparatus would output images in which the number 0 and the number 2 in the input image are exchanged.

For another example, if the pixel information (for example, the pixel information corresponding to 0) of at least one of the output sub-images obtained after the input image is processed by the image classification apparatus is replaced with pixel information corresponding to other categories (for example, pixel information corresponding to 5), then the restored image output by the image restoring apparatus is to replace the number 0 in the original input image with the image of the number 5.

Figure 11:
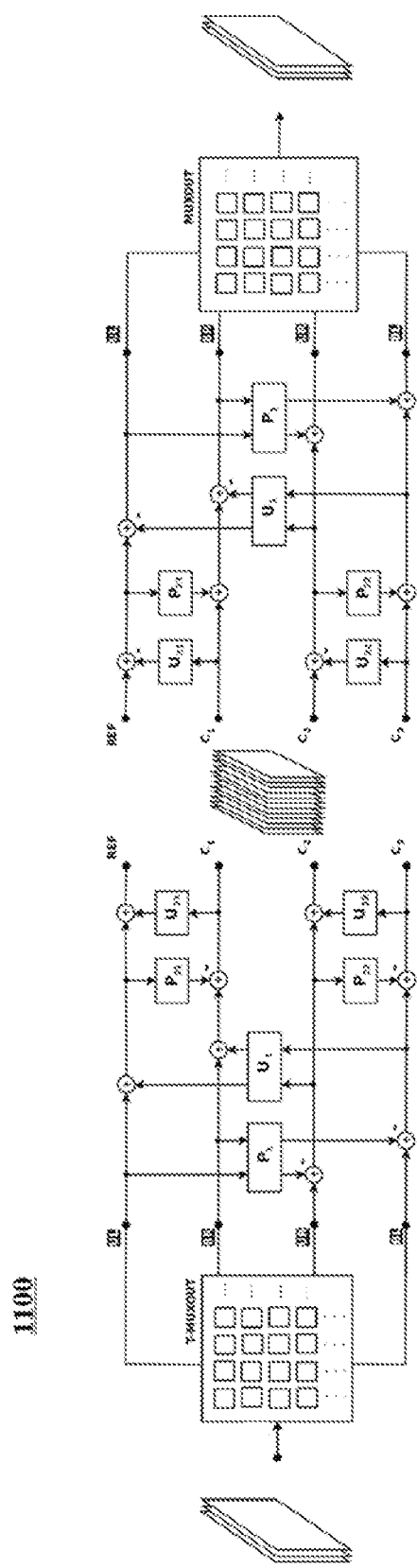
FIG. 11 schematically shows a process of performing transform encoding and transform decoding on an image.

FIG. 11 schematically shows a process of performing transform encoding and transform decoding on an image. The input image is received at the input terminal of the transform encoding unit. As shown in FIG. 11, the input image can comprise an arbitrary number of channels, for example, three channels RGB. After being processed by a first stage of transform decoding unit, the input image is split into four lower-resolution sub-images by the T-MUXOUT unit. As described above, the input image can be split into an arbitrary number of sub-images. Image transform is performed by the transform unit on the split sub-images, to obtain image components. It can be seen that as for the input image including a plurality of channels, each arrow of a first stage of transform decoding unit as shown in FIG. 11 can process data of a plurality of channels. For example, as for the input image including the three channels RGB, each arrow in the first stage of transform encoding unit represents that the data in the input or the output at this time has three channels. After being processed by the first stage of transform encoding unit, each channel of the input image is transformed into four image components.

According to the actual requirements for image processing, the image can be processed by using multiple stages of transform encoding units. For example, after being processed by n stages of transform encoding units, the input image as shown in FIG. 11 can obtain $4^n$ image components, of which one or more image components comprise the category information of the input image, and other images components are image components including other details. Compared with the category information, the pixel information of other image components is close to zero. That is to say, through the image transform method provided in the embodiments of the present disclosure, the category of the input image and the pixel information corresponding to the category in the input image can be determined according to the pixel information of the image components obtained after being transformed.

Additionally, since each stage of transform encoding unit would split the input image into more low-resolution sub-images, each stage of transform encoding unit can have more channels than a previous stage of transform encoding unit. For example, as for the input image as shown in FIG. 11, each arrow in the first stage of transform encoding unit represents that input/output includes 3 channels of data, each arrow in the second stage of transform encoding unit represents that input/output includes 12 channels of data, and so on and so forth, each arrow in the n-th stage of transform encoding unit represents that input/output includes $3*4^{n-1}$ channels of data.

The image transform encoding process as described above is invertible, and is corresponding to the n-th stage of transform encoding unit. Using the n-th stage of transform encoding unit having the same configuration can restore the input image without losing the image information. Each stage of transform decoding unit is used to perform an inverse transform on a plurality of input image components, perform a combination operation on the transformed image components, and restore the image components to higher-resolution image components. Corresponding to the encoding process, after being processed by the same number of stages of decoding processes, the plurality of image components can be restored to the original input image. No further details are given herein.

Figure 12:
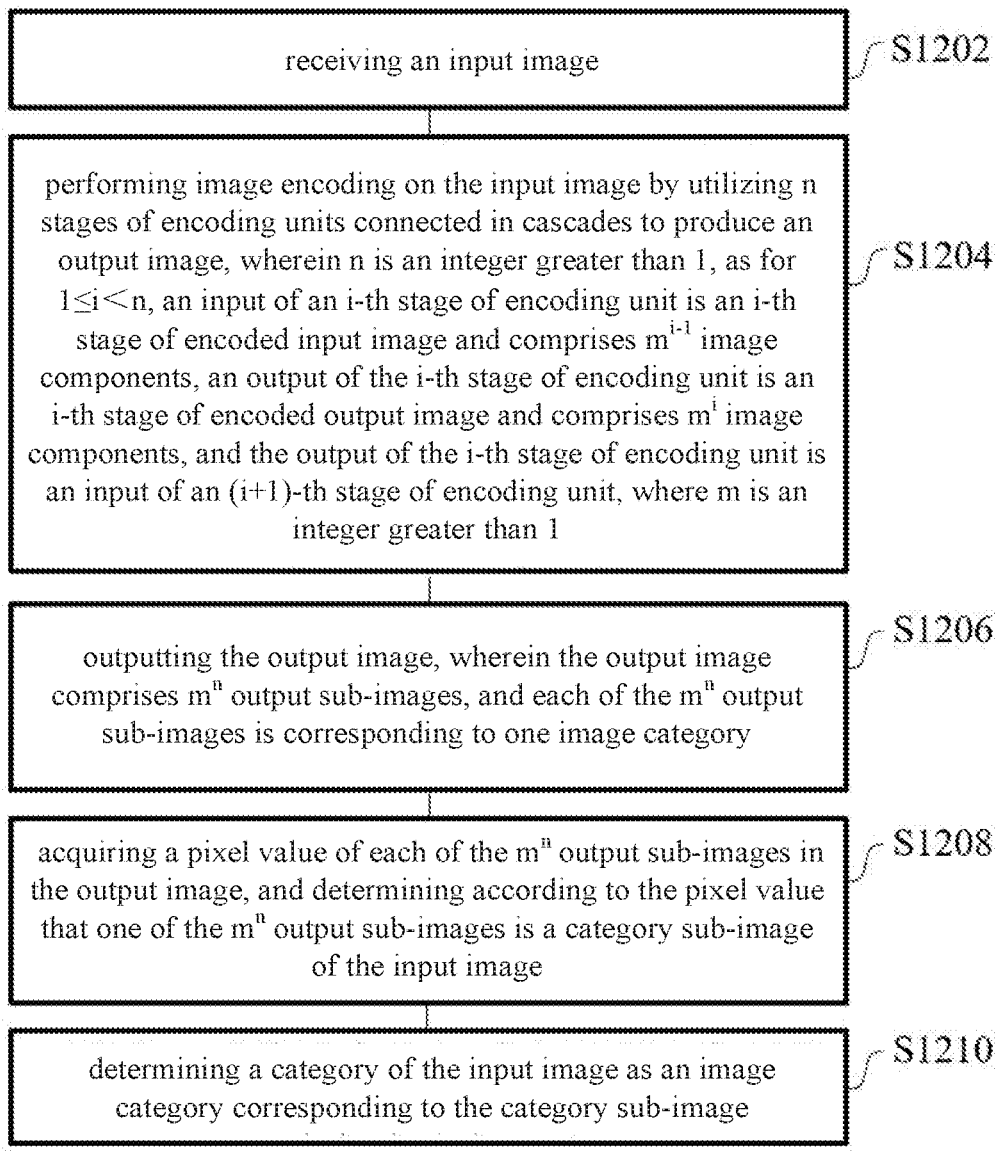
FIG. 12 shows a flowchart of an image classification method according to some embodiments of the present disclosure.

FIG. 12 shows a flowchart of an image classification method according to some embodiments of the present disclosure. An image classification method 1200 can be executed by utilizing the image classification apparatus as shown in FIG. 5. In step S1202, an input image is received. Then, in step S1204, image encoding is performed on the input image by utilizing the n stages of encoding units connected in cascades to produce an output image, where n is an integer greater than or equal to 1. As for 1≤i<n, an input of the i-th stage of encoding unit is an i-th stage of encoded input image and comprises $m^{i-1}$ image components, an output of the i-th stage of encoding unit is an i-th stage of encoded output image and comprises $m^i$ image components, and the output of the i-th stage of encoding unit is an input of an (i+1)-th stage of encoding unit, where m is an integer greater than 1. In step S1206, the output image is output, the output image comprises $m^n$ output sub-images, the $m^n$ output sub-images are corresponding to $m^n$ output image components of the n-th stage of encoding unit respectively, and each of the $m^n$ output sub-images is corresponding to one image category. In step S1208, a pixel value of each of the $m^n$ output sub-images in the output image is obtained, and one of the $m^n$ output sub-images is determined as a category sub-image of the input image according to the pixel value. In some embodiments, the step S1208 comprises comparing the pixel value of each of the $m^n$ output sub-images with a first threshold, determining an output sub-image whose pixel value is greater than the first threshold as the category sub-image, and outputting a category tag corresponding to the category sub-image, of which the category sub-image comprises the pixel information corresponding to the category tag in the input image. In step S1210, the category of the input image is determined as an image category corresponding to the category sub-image.

The above image classification method is capable of classifying the input image, determining the category of the input image, and at the same time outputting the pixel information of the image category corresponding to the input image.

Figure 13:
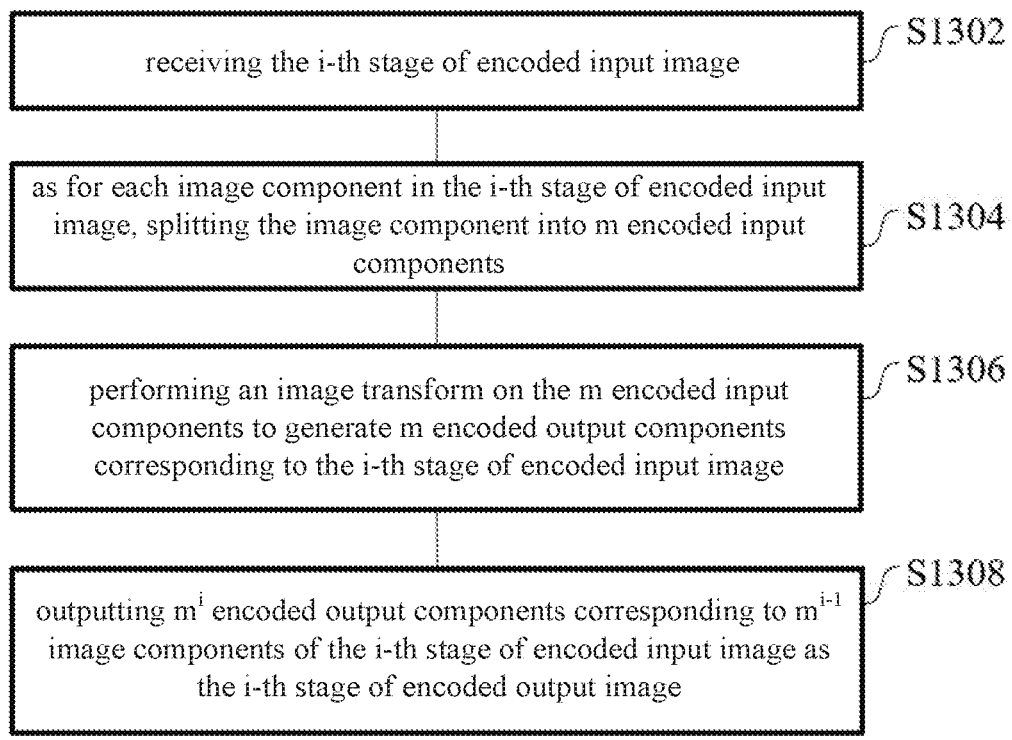
FIG. 13 shows a flowchart of an image encoding process according to some embodiments of the present disclosure.

FIG. 13 shows a flowchart of an image encoding process of the i-th stage of transform encoding unit according to some embodiments of the present disclosure. An image encoding process 1300 can be performed by utilizing the transform encoding unit 510-i as shown in FIG. 5. In step S1302, an i-th stage of encoded input image is received. In step S1304, as for each image component in the i-th stage of encoded input image, the image component is split into m encoded input components. In step S1306, as for each image component in the i-th stage of encoded input image, an image transform is performed on m encoded input components obtained by splitting the image component, to generate m encoded output components corresponding to the image component. In step S1308, $m^i$ encoded output components corresponding to m image components of the i-th stage of encoded input are output as an i-th stage of encoded output image.

FIG. 14 shows a flowchart of an image transform process in the i-th stage of transform encoding unit according to some embodiments of the present disclosure when m=4. An image transform process 1400 can be performed by utilizing the transform unit 514 as shown in FIG. 5 or FIG. 7.

When m=4, each image component in the i-th stage of encoded input image is split into a first encoded input component, a second encoded input component, a third encoded input component and a fourth encoded input component. Therefore, in step S1402, the transform unit 513 receives the first encoded input component, a second encoded input component, a third encoded input component and a fourth encoded input component. In step S1404, a prediction image is generated based on the first encoded output component and the second encoded input component, and difference image of the third encoded input component, the fourth encoded input component and the prediction image are acquired.

Figure 15A:
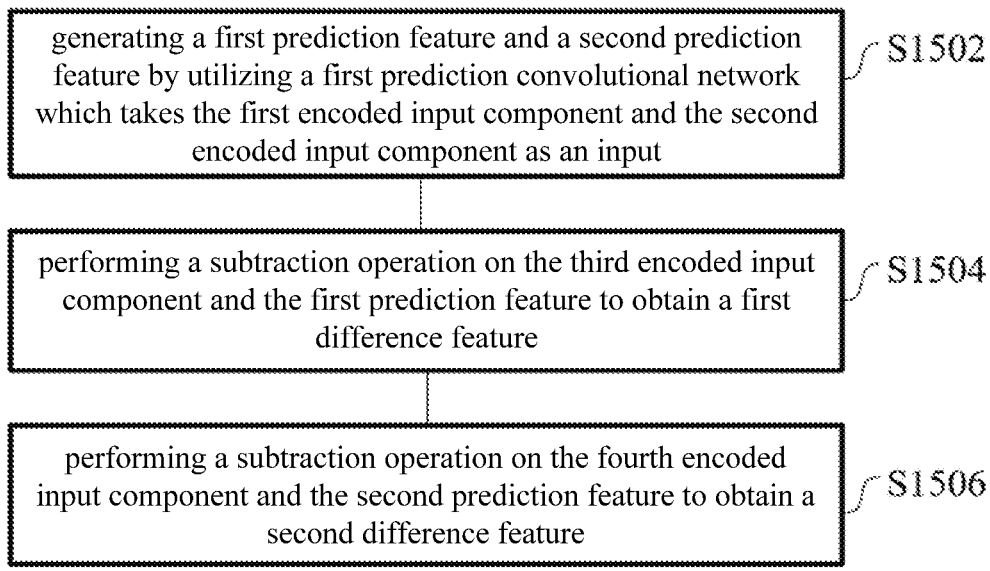
FIG. 15A shows a flowchart of an image transform process in an $i^{th}$ stage of transform encoding unit according to some embodiments of the present disclosure.

Herein, as shown in FIG. 15A, the step S1404 can further comprise: in step S1502, a first prediction feature and a second prediction feature are generated by utilizing a first prediction convolutional network $P_1$ which takes the first encoded input component and the second encoded input component as an input. The first prediction feature and the second prediction feature may be the same, or may be different; in step S1504, a subtraction operation is performed on the third encoded input component and the first prediction feature to obtain a first difference feature. In step S1506, a subtraction operation is performed on the fourth encoded input component and the second prediction feature to obtain a second difference feature.

In step S1406, an update image of the first encoded input component and the second encoded input component is generated based on the difference image, the first encoded input component and the second encoded input component.

Figure 15B:
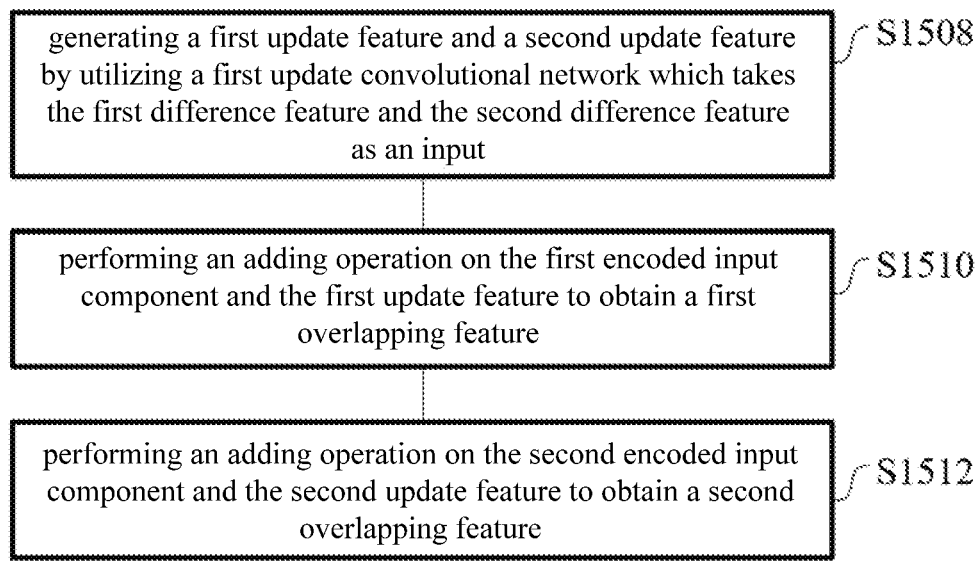
FIG. 15B shows a flowchart of an image transform process in an $i^{th}$ stage of transform encoding unit according to some embodiments of the present disclosure.

Herein, as shown in FIG. 15B, the step S1404 can further comprise: in step S1508, a first update feature and a second update feature are generated by utilizing a first update convolutional network $U_1$ which takes the first difference feature and the second difference feature as an input. The first update feature and the second update feature may be the same, or may be different; in step S1510, an adding operation is performed on the first encoded input component and the first update feature to obtain a first adding feature; in step S1512, an adding operation is performed on the second encoded input component and the second update feature to obtain a second adding feature.

In step S1408, a wavelet transform based on an update image is performed, and a first encoded output component and a second encoded output component are generated based on a result of the wavelet transform.

In step S1410, the wavelet transform based on a difference image is performed, and a third encoded output component and a fourth encoded output component are generated based on the result of the wavelet transform.

FIG. 16 shows a flowchart of the wavelet transform based on the update image according to some embodiments of the present disclosure. A wavelet transform 1600 based on the update image can be implemented by utilizing the first wavelet transform unit 730 as shown in FIG. 7. In step S1602, a third prediction feature for the first adding feature is generated by utilizing a second prediction convolutional network $P_{21}$ which takes the first adding feature as an input. In step S1604, a subtraction operation is performed on the second adding feature and the third prediction feature to obtain the second decoded output component. In step S1606, a third update feature for the second encoded output component is generated by utilizing a second update convolutional network $U_{21}$ which takes the second encoded output component as an input. In step S1608, an adding operation is performed on the first adding feature and the third update feature to obtain the first encoded output component.

FIG. 17 shows a flowchart of a wavelet transform based on the difference image according to some embodiments of the present disclosure. A wavelet transform 1700 based on the difference image can be implemented by utilizing the second wavelet transform unit 740 as shown in FIG. 7. In step S1702, a fourth prediction feature is generated by utilizing the third prediction convolutional network $P_{22}$ which takes the first difference feature as an input. In step S1704, a subtraction operation is performed on the second difference feature and the fourth prediction feature to obtain the fourth encoded output component. In step S1706, a fourth update feature is generated by utilizing a third update convolutional network $U_{22}$ which takes the fourth encoded output component as an input. In step S1708, an adding operation is performed on the first difference feature and the fourth update feature to obtain the third encoded output component.

In the image transform method provided according to the embodiments of the present disclosure, a plurality of image components in the input image can be extracted, and the category of the input image is determined based on the pixel values of the plurality of extracted image components.

FIG. 18 shows a flowchart of an image restoring method according to some embodiments of the present disclosure. An image restoring method 1800 can be executed by utilizing the image restoring apparatus as shown in FIG. 8. In step S1802, an input image is received, and the input image comprises $m^n$ image components. In step S1804, image decoding is performed on the input image by utilizing n stages of decoding units connected in cascades to produce a restored image. As for $1 \leq i < n$, an input of an i-th stage of decoding unit is an i-th stage of decoded input image and comprises $m^i$ image components, an output of the i-th stage of decoding unit is an i-th stage of decoded output image and comprises $m^{i-1}$ image components, and the output of the i-th stage of decoding unit is an input of an (i+1)-th stage of decoding unit. In step S1806, a stored image corresponding to the input image is output.

In order to restore the image without any loss, the image restoring method 1800 is corresponding to the image classification method 1200. That is to say, for example, when the image classification method 1200 comprises n stages of encoding units, and the image restoring method 1800 also comprise n stages of decoding units correspondingly.

FIG. 19 shows a flowchart of an image decoding method of the i-th stage of transform decoding unit according to the embodiments of the present disclosure. An image decoding method 1900 can be executed by utilizing the transform decoding unit 810 as shown in FIG. 8. In step S1902, an i-th stage of decoded input image is received, of which an i-th stage of input image comprises $m^i$ input sub-images. In step S1904, an image inverse transform is performed on the $m^i$ image components, to generate $m^i$ decoded output components corresponding to the i-th stage of decoded input image. In step S1906, the $m^i$ decoded output components are combined to $m^{i-1}$ decoded output sub-images. In step S1908, the decoded output sub-images corresponding to the $m^i$ image components of the i-th stage of decoded input image are output as the i-th stage of decoded output image.

Figure 20:
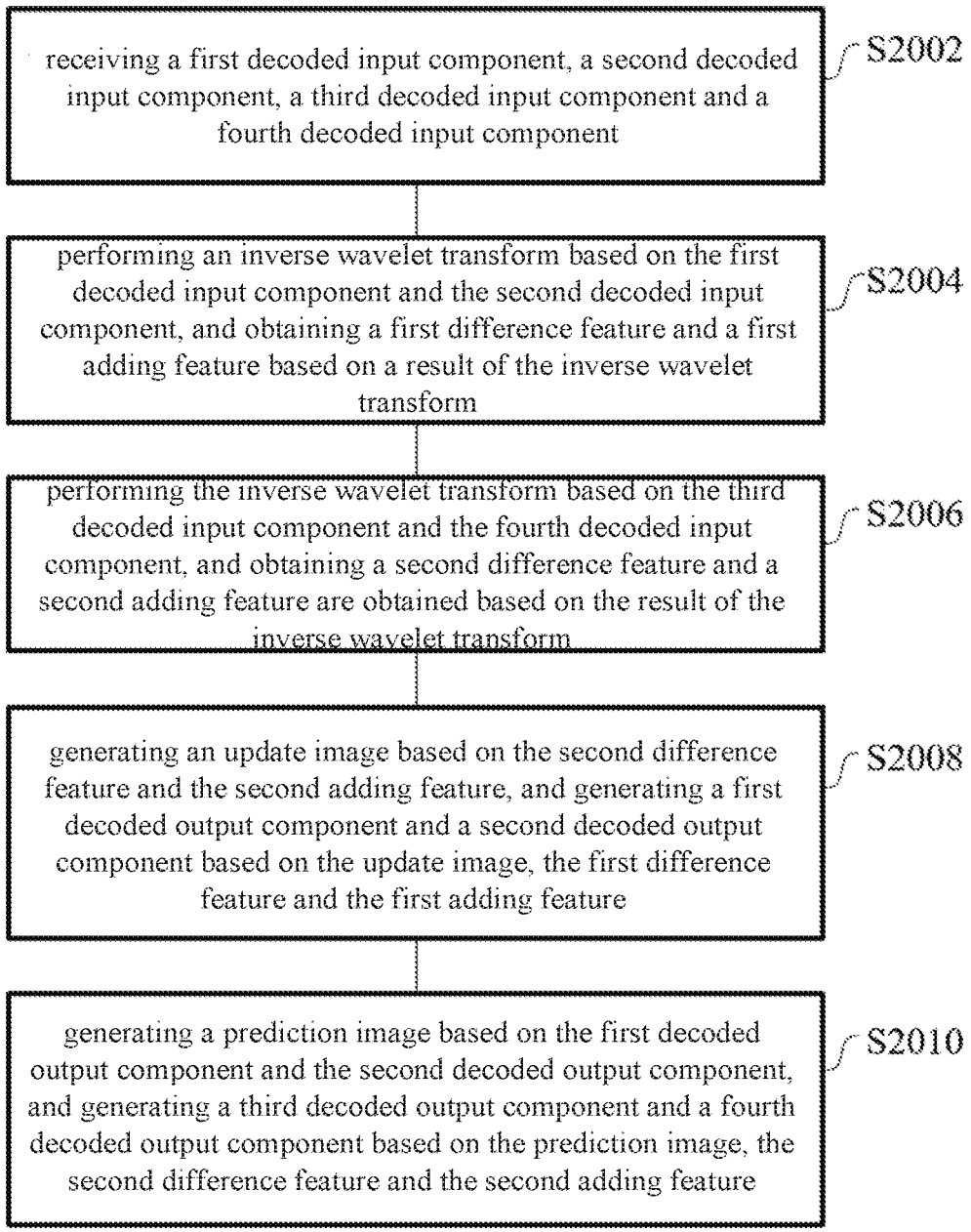
FIG. 20 shows a flowchart of an image inverse transform method according to some embodiments of the present disclosure.

FIG. 20 shows a flowchart of an image inverse transform method when m=4 according to some embodiments of the present disclosure. An image inverse transform method 2000 can be executed by utilizing the inverse transform unit 812 as shown in FIG. 8 or FIG. 9. In step S2002, the inverse transform unit 812 receives the first decoded input component, the second decoded input component, the third decoded input component and the fourth decoded input component. In step S2004, an inverse wavelet transform based on the first decoded input component and the second decoded input component is performed, and a first difference feature and a first adding feature are obtained based on a result of the inverse wavelet transform. In step S2006, the inverse wavelet transform based on the third decoded input component and the fourth decoded input component is performed, and a second difference feature and a second adding feature are obtained based on the result of the inverse wavelet transform.

In step S2008, an update image is generated based on the second difference feature and the second adding feature, and the first decoded output component and the second decoded output component are generated based on the update image, the first difference feature and the first adding feature.

Figure 21A:
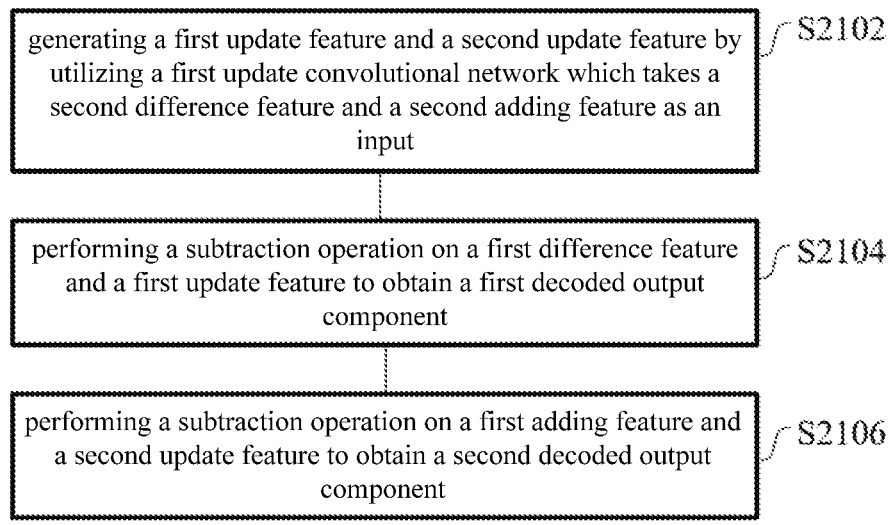
FIG. 21A shows a flowchart of an image decoding method of an $i^{th}$ stage transform decoding unit according to some embodiments of the present disclosure.

As shown in FIG. 21A, the step S2008 can further comprise: in step S2102, a first update feature and a second update feature are generated by utilizing a first update convolutional network $U'_1$ which takes the second difference feature and the second adding feature as an input. The first update feature and the second update feature may be the same, or may be different. In step S2104, a subtraction operation is performed on the first difference feature and the first update feature to obtain the first decoded output component. In step S2106, a subtraction operation is performed on the first adding feature and the second update feature to obtain the second decoded output component.

In step S2010, a prediction image is generated based on the first decoded output component and the second decoded output component, and the third decoded output component and the fourth decoded output component are generated based on the prediction image, the second difference feature and the second adding feature.

Figure 21B:
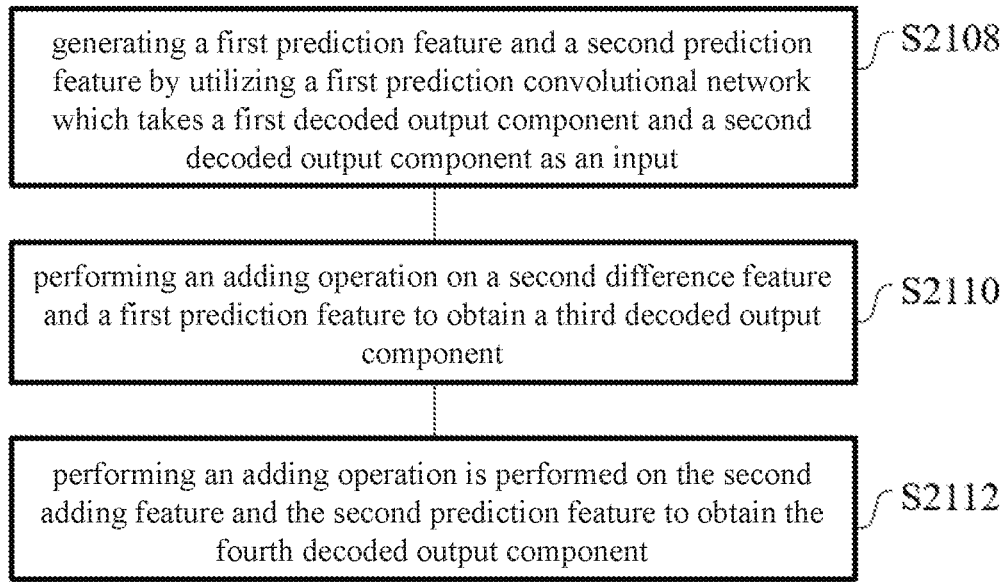
FIG. 21B shows a flowchart of an image decoding method of an $i^{th}$ stage of transform decoding unit according to some embodiments of the present disclosure.

As shown in FIG. 21B, step S2010 can further comprise: in step S2108, a first prediction feature and a second prediction feature are generated by utilizing a first prediction convolutional network P'$_1$ which takes the first decoded output component and the second decoded output component as an input. The first prediction feature and the second prediction feature may be the same, or may be different. In step S2110, an adding operation is performed on the second difference feature and the first prediction feature to obtain the third decoded output component. In step S2106, an adding operation is performed on the second adding feature and the second prediction feature to obtain the fourth decoded output component.

Figure 22:
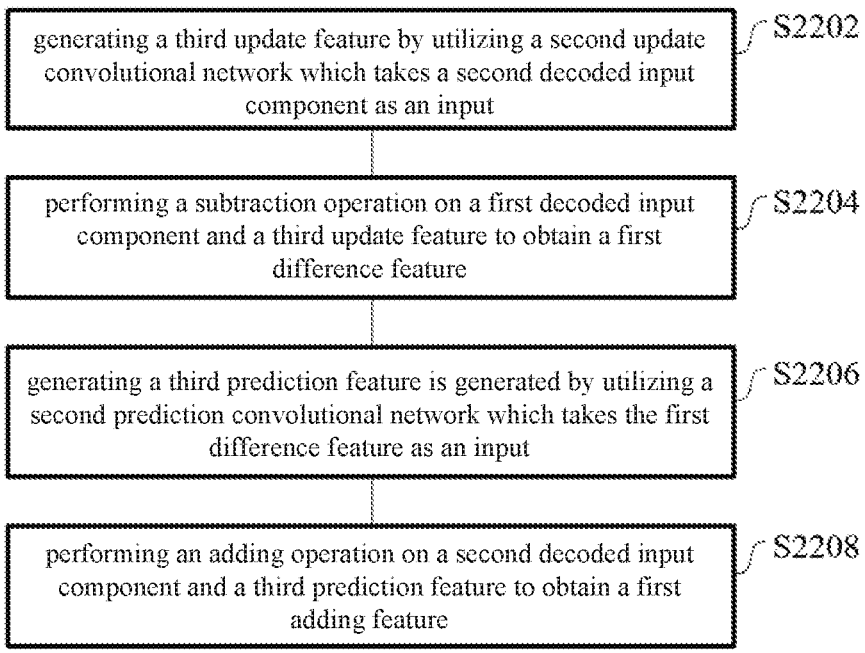
FIG. 22 shows a flowchart of an inverse wavelet transform method based on a first decoded input component and a second decoded input component.

FIG. 22 shows a flowchart of an inverse wavelet transform method based on the first decoded input component and the second decoded input component. An inverse wavelet transform method 2200 can be executed by utilizing the inverse wavelet transform unit 930 as shown in FIG. 9. In step S2202, a third update feature is generated by utilizing a second update convolutional network U'$_{21}$ which takes the second decoded input component as an input. In step S2204, a subtraction operation is performed on the first decoded input component and the third update feature to obtain the first difference feature. In step S2206, the third prediction feature is generated by utilizing the second prediction convolutional network P'21 which takes the first difference feature as an input. In step S2208, the adding operation is performed on the second decoded input component and the third prediction feature to obtain the first adding feature.

Figure 23:
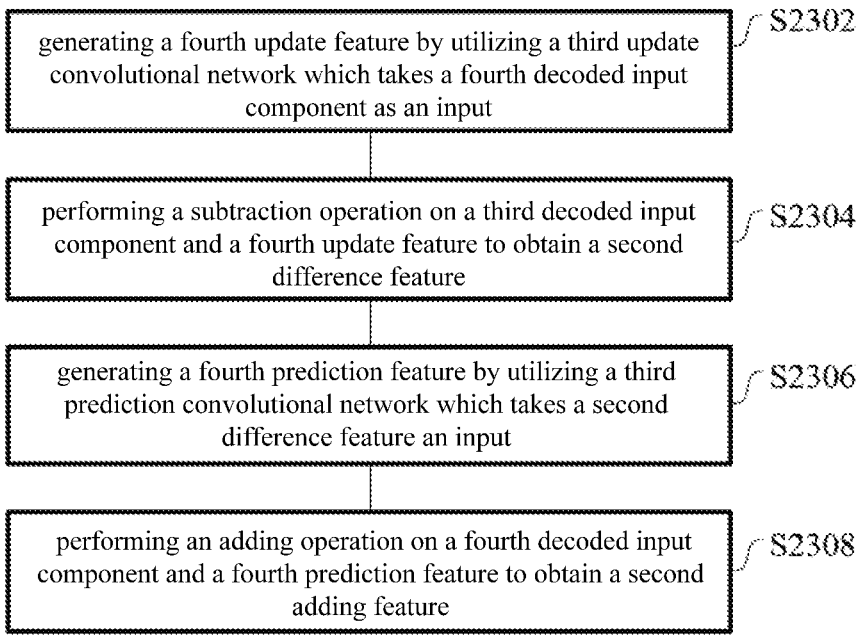
FIG. 23 shows a flowchart of an inverse wavelet transform method based on a third decoded input component and a fourth decoded input component.

FIG. 23 shows a flowchart of an inverse wavelet transform method based on the third decoded input component and the fourth decoded input component. An inverse wavelet transform method 2300 can be executed by utilizing the inverse wavelet transform unit 940 as shown in FIG. 9. In step S2302, a fourth update feature is generated by utilizing a third update convolutional network U'$_{22}$ which takes the fourth decoded input component as an input. In step S2304, a subtraction operation is performed on the third decoded input component and the fourth update feature to obtain the second difference feature. In step S2306, a fourth prediction feature is generated by utilizing a third prediction convolutional network P'$_{22}$ which takes the second difference feature an input. In step S2308, the adding operation is performed on the fourth decoded input component and the fourth prediction feature to obtain the second adding feature.

By utilizing the image restoring method provided in the present disclosure, the image component can be restored to the original image without losing any information.

Figure 24:
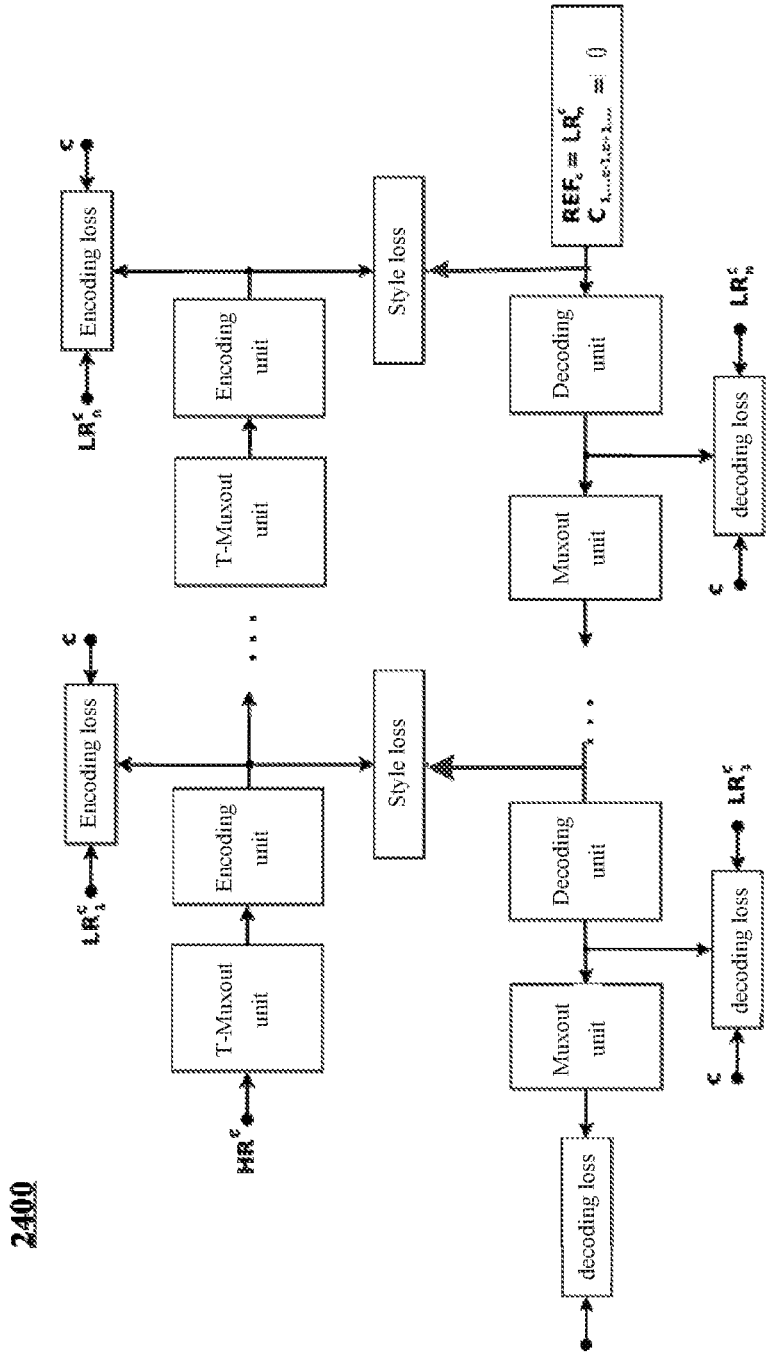
FIG. 24 shows a schematic diagram of an image processor according to some embodiments of the present disclosure.

FIG. 24 shows a schematic diagram of an image processor according to some embodiments of the present disclosure. As shown in FIG. 24, the first half of an image processor 2400 may be the transform encoding unit in the image classification apparatus as shown in FIG. 5 and is used to extract a plurality of image components from the input image. The second half of the image processor 2400 may be the image restoring apparatus as shown in FIG. 8 and is used to restore the image component. The process of classification and restoration of the image can be realized by utilizing the image processor 2400. The specific structures of the image classification apparatus and the image restoring apparatus have been described in the above text in details, and thus no further details are given herein.

Configurations of the parameters of respective convolutional networks in the image processor 2400 can be realized by utilizing the deep learning method.

The training method according to the embodiments of the present disclosure comprises following steps:

A training image is input into the image processor. weight values of respective convolutional networks in respective convolutional layers in the n-th stage of encoding unit and the n-th stage of decoding unit are adjusted, and a limited number of iterations are run to optimize a target function.

As for the image processor as shown in FIG. 24, the training image is input with respect to each stage of encoding unit and decoding unit. For example, an original high-resolution HR image is input to the input terminal of the image processor.

In some embodiments, the target function can comprise one of or a sum of several of encoding loss, decoding loss, style loss, and weight regularization coefficient in the image processor. The calculation method of the above loss functions will be introduced in the following text.

After the HR image is processed by the first stage of encoding unit, encoding loss between a reference image REF$_1$ output by the first stage of encoding unit and a training image LR$_1$ of the first stage of encoding unit is calculated. The above encoding loss can be calculated through an encoding loss function L$_{ENCK}$ as shown in equation (1):

$$L_{ENC_k} = \|REF_k - LR_k\|_2 + \sum_{\substack{i=1 \\ i \neq C_k}}^{c_0 \cdot m^k} \|C_{ki}\|_1 \tag{1}$$

Herein, $$\|x\|_2 = \sum_i x_i^2, \|x\|_1 = \sum_i |x_i|$$

REF$_k$ is a first image component output by a k-th stage of encoding unit, and LR$_k$ is a training image of the k-th stage of encoding unit, where LR$_k$ is a downsampling image of the training image of the image processor, and has a size as the same as REF$_k$; C$_0$ is the number of the training images; C$_{ki}$ is an image component output by a k-th stage of encoding unit, where $1 \leq i \leq m^k - 1$.

Correspondingly, in the decoding process, the decoding loss between the reference image REF$_k$ output by the k-th stage of decoding unit and the training image of the k-th stage of decoding unit. The training image input by the decoding unit comprises M=m*n image components, where one image component is the downsampling image of the HR image, and other image components are 0.

The above decoding loss can be calculated through the decoding loss function L$_{DECK}$ as shown in the equation (2):

$$L_{DEC_k} = IQ(REF_k, LR_k) \tag{2}$$

where an IQ function evaluates the difference between REF$_k$ and LR$_k$. In some embodiments, the IQ function may be a MSE function:

MSE(X,Y)=$\|X-Y\|_2$, where X, Y represent the image data of REF$_k$ and LR$_k$ respectively.

In some embodiments, the IQ function may be a SSIM function:

$$SSIM(X, Y) = \frac{(2\mu_X\mu_Y + c_1)(2\sigma_{XY} + c_2)}{(\mu_X^2 + \mu_Y^2 + c_1)(\sigma_X^2 + \sigma_Y^2 + c_2)},$$

where X, Y represent the image data of $REF_k$ and $LR_k$ respectively. $\mu_X$ and $\mu_Y$ represent an average value of X and Y, $\sigma_X$ and $\sigma_Y$ represent a standard deviation of X and Y, $c_1=(0.01\times D)^2$, $c_2=(0.03\times D)^2$, and D represents a dynamic range of the image, for example, for a floating-point number, the value of D is always 1.0.

Additionally, the style loss function of the current stage can be calculated according to the output of the i-th stage of encoding unit and the input of a corresponding stage of encoding unit. For example, a style loss function of the first stage can be calculated according to the output of the first stage of encoding unit and the input a n-th stage of decoding unit. A style loss function of the second stage can be calculated according to the output of the second stage of encoding unit and the input of a (n−1)-th stage of decoding unit. The style loss function can be defined through the equation (3):

$$L_{STYLE_k}(X,Y)=\|G_X-G_Y\|_2 \quad (3)$$

where as for an image component F having m channels, $$G_F(k, l) = \frac{1}{hw}\sum_{i=1}^{m} F^k(i)F^l(i);$$

where Gx and Gy are characteristic vectors of Grampian Matrix of the image X and the image Y respectively, X is an output image of a k-th stage of encoding unit, and Y is an output image of an (i+1−k)-th stage of encoding unit, where 1≤k≤n.

Additionally, the weight regularization coefficient of the system is defined through the equation (4):

$$L_{REG} = \frac{\|W\|_1}{\|b\|_1} \quad (4)$$

where W is a weight parameter of all convolutional networks in the image processor, and b is a bias of all convolutional networks in the image processor.

A total loss function of the image processor can be calculated based on one or more of the above loss functions. The total loss function of the image processor can be applicable to optimization strategy of any deep learning, such as Stochastic Gradient Descent SGD or its modifications (such as vectors of motion, SGD, Adam, RMSProp, etc.).

The training method of the image processor provided in the embodiments of the present disclosure can configure parameters of the convolutional neutral network in the image processor by utilizing the strategy of depth learning. By calculating a loss function between the images generated in the training image and the image processor as the target function, the parameters of the convolutional neutral network in the image processor are adjusted so that the target function is optimized, so as to realize a better image classification effect.

It needs to be specified that in the present disclosure, terms of "include", "comprise" or any other variants intend to cover non-exclusive containing, so that a process, a method, an object or a device including a series of elements not only comprise those elements, but also comprise other elements not explicitly listed, or also comprise elements inherent to this process, method, object or device. In the case of no more limitations, an element defined by a sentence of "comprise a/an . . . " does not exclude that other same elements exist in the process, method, object or device including the elements.

Finally, it needs to note that the series of processes described above not only comprise processes executed according to a time sequence and in the order described herein, but also comprise processes executed in parallel or executed separately but not executed in chronological order.

Through the description of the above implementations, those skilled in the art can clearly know that the present disclosure can be realized by means of a software together with a necessary hardware platform, and of course can be implemented by only a hardware. Based on such understanding, all or part of contributions made by the technical solutions of the present disclosure to the background art can be reflected in a form of a software. This computer software product can be stored in a storage medium, such as ROM/RAM, magnetic disk, optical disk, etc., and comprises several instructions to enable one piece of computer device (it may be a personal computer, a server, or a network device, etc.) to execute respective embodiments of the present disclosure or the method of some parts of the embodiments.

The above descriptions introduce the present disclosure in detail. The present text describes the principles and implementations of the present disclosure by applying the specific embodiments. The description of the above embodiments are just used to help understanding the method of the present disclosure and its core concept; at the same time, for those ordinary skilled in the art, according to the concept of the present disclosure, changes would occur to both the specific implementations and application scopes. To sum up, the content of the present disclosure would not be understood as the limitation to the present disclosure.

What is claimed is:

1. An image classification method, comprising:
    receiving an input image;
    performing image encoding on the input image by utilizing n stages of encoding units connected in cascades to produce an output image, wherein n is an integer greater than 1, and wherein as for 1≤i<n, an input of an i-th stage of encoding unit is an i-th stage of encoding unit input image and comprises $m^{i-1}$ image components, an output of the i-th stage of encoding unit is an i-th stage of encoding unit output image and comprises $m^i$ image components, and the output of the i-th stage of encoding unit is an input of an (i+1)-th stage of encoding unit, wherein m is an integer greater than 1;
    outputting the output image, wherein the output image comprises $m^n$ output sub-images, the $m^n$ output sub-images are corresponding to $m^n$ output image components of an n-th stage of encoding unit, and each of the $m^n$ output sub-images is corresponding to an image category;
    acquiring a pixel value of each of the $m^n$ output sub-images in the output image, and comparing a sum of pixel values of respective pixels in each sub-image among the $m^n$ output sub-images with a first threshold, determining an output sub-image having a sum of pixel values greater than the first threshold as a category sub-image, and outputting a category tag corresponding to the category sub-image, wherein the category sub-image comprises pixel information corresponding to the category tag in the input image, and
    determining a category of the input image as an image category corresponding to the category sub-image.

2. The image classification method according to claim 1, wherein the input image and each of the $m^n$ output sub-images comprise three channels R, G, B.

3. The image classification method according to claim 1, wherein performing image encoding by utilizing the i-th stage of encoding unit comprises:
receiving the i-th stage of encoding unit input image;
as for each image component in the i-th stage of encoding unit input image, splitting the image component into m encoding unit input components, wherein a size of each of the m encoding unit input components is 1/m time of the size of each image component in the i-th stage of encoding unit input image, performing an image transform on the m encoding unit input components to generate m encoded output components corresponding to the image component, wherein a size of each of the m encoded output components is the same as the size of each of the m encoding unit input components;
outputting a encoded output components corresponding to $m^{i-1}$ image components of the i-th stage of encoding unit input image as the i-th stage of encoding unit output image.

4. The image classification method according to claim 3, wherein m=4, each image component in the i-th stage of encoding unit input image is split into a first encoding unit input component, a second encoding unit input component, a third encoding unit input component and a fourth encoding unit input component, performing an image transform on the first encoding unit input component, the second encoding unit input component, the third encoding unit input component and the fourth encoding unit input component by utilizing the i-th stage of encoding unit comprises:
receiving the first encoding unit input component, the second encoding unit input component, the third encoding unit input component and the fourth encoding unit input component;
generating a prediction image based on the first encoding unit input component and the second encoding unit input component and acquiring a difference image of the third encoding unit input component, the fourth encoding unit input component, and the prediction image;
generating an update image for the first encoding unit input component and the second encoding unit input component based on the difference image, the first encoding unit input component and the second encoding unit input component;
performing a wavelet transform based on the update image to generate a first encoded output component and a second encoded output component based on a result of the wavelet transform;
performing a wavelet transform based on the difference image to generate a third encoded output component and a fourth encoded output component based on a result of the wavelet transform.

5. The image classification method according to claim 4, wherein
generating a prediction image based on the first encoding unit input component and the second encoding unit input component and acquiring a difference image of the third encoding unit input component, the fourth encoding unit input component, and the prediction image comprises:
generating a first prediction feature and a second prediction feature by utilizing a first prediction convolutional network taking the first encoding unit input component and the second encoding unit input component as an input;
performing a subtraction operation on the third encoding unit input component and the first prediction feature to obtain a first difference feature;
performing a subtraction operation on the fourth encoding unit input component and the second prediction feature to obtain a second difference feature;
wherein generating an update image based on the difference image, the first encoding unit input component and the second encoding unit input component comprises:
generating a first update feature and a second update feature by utilizing a first update convolutional network taking the first difference feature and the second difference feature as an input;
performing an adding operation on the first encoding unit input component and the first update feature to obtain a first adding feature;
performing an adding operation on the second encoding unit input component and the second update feature to obtain a second adding feature.

6. The image classification method according to claim 5, wherein performing the wavelet transform based on the update image to generate a first encoded output component and a second encoded output component based on a result of the wavelet transform comprises:
generating a third prediction feature by utilizing a second prediction convolutional network taking the first adding feature as an input;
performing a subtraction operation on the second adding feature and the third prediction feature to obtain the second encoded output component;
generating a third update feature by utilizing a second update convolutional network taking the second encoded output component as an input;
performing an adding operation on the first adding feature and the third update feature to obtain the first encoded output component.

7. The image classification method according to claim 5, wherein performing a wavelet transform based on the difference image to generate a third encoded output component and a fourth encoded output component based on a result of the wavelet transform comprises:
generating a fourth prediction feature by utilizing a third prediction convolutional network taking the first difference feature as an input;
performing a subtraction operation on the second difference feature and the fourth prediction feature to obtain the fourth encoded output component;
generating a fourth update feature by utilizing a third update convolutional network taking the fourth encoded output component as an input;
performing an adding operation on the first difference feature and the fourth update feature to obtain the third encoded output component.

8. A non-transitory computer readable medium, upon which instructions are stored, and enables a computer to execute the image classification method according to claim 1 when a processor executed the instructions.

9. An image classification apparatus, comprising:
an input terminal, configured to receive an input image;
n stages encoding units connected in cascaded, configured to perform image encoding on the input image to produce an output image, wherein n is an integer greater than 1, and wherein as for $1 \le i < n$, an input of an i-th stage of encoding unit is an i-th stage of encoding unit input image and includes $m^{i1}$ image components, an output of the i-th stage of encoding unit is an i-th stage of encoding unit output image and includes $m^i$ image components, and the output of the i-th stage of encoding unit is an input of an (i+1)-th stage of encoding unit, wherein m is an integer greater than 1;

an output terminal, configured to output the output image, wherein the output image comprises $m^n$ output sub-images, the $m^n$ output sub-images are corresponding to $m^n$ output image components of an n-th stage of encoding unit, and each of the $m^n$ output sub-images is corresponding to an image category;

a classification unit, configured to acquire a pixel value of each of the $m^n$ output sub-images in the output image, and compare a sum of pixel values of respective pixels in each sub-image among the $m^n$ output sub-images with a first threshold, determine an output sub-image having a sum of pixel values greater than the first threshold as a category sub-image, and output a category tag corresponding to the category sub-image, wherein the category sub-image comprises pixel information corresponding to the category tag in the input image, and determine a category of the input image as an image category corresponding to the category sub-image.

10. The image classification apparatus according to claim 9, wherein the input image and each of the $m^n$ output sub-images comprise three channels R, G, B.

11. The image classification apparatus according to claim 9, wherein the i-th stage of encoding unit comprises:

an input terminal, configured to receive the i-th stage of encoding unit input image;

a T-MUXOUT unit, configured to, as for each image component in the i-th stage of encoding unit input image, split the image component into m encoding unit input components, wherein a size of each of the m encoding unit input components is 1/m time of the size of each image component in the i-th stage of encoding unit input image;

a transform unit, configured to, as for each image component in the i-th stage of encoding unit input image, perform an image transform on the m encoding unit input components obtained by splitting the image component, generate m encoded output components corresponding to the image component, wherein a size of each of the m encoded output components is the same as the size of each of the m encoding unit input components;

an encoded output terminal, configured to output $m^i$ encoded output components corresponding to $m^{i-1}$ image components of the i-th stage of encoding unit input image as the i-th stage of encoding unit output image.

12. The image classification apparatus according to claim 11, wherein m=4, each image component in the i-th stage of encoding unit input image is split into a first encoding unit input component, a second encoding unit input component, a third encoding unit input component and a fourth encoding unit input component, the transform unit of the i-th stage of encoding unit further comprises:

a first prediction unit, configured to generate a prediction image based on the first encoding unit input component and the second encoding unit input component and acquire a difference image of the third encoding unit input component, the fourth encoding unit input component and the prediction image;

a first update unit, configured to generate an update image for the first encoding unit input component and the second encoding unit input component based on the difference image, the first encoding unit input component and the second encoding unit input component;

a first wavelet transform unit, configured to perform a wavelet transform based on the update image, and generate a first encoded output component and a second encoded output component based on a result of the wavelet transform;

a second wavelet transform unit, configured to perform a wavelet transform based on the difference image, and generate a third encoded output component and a fourth encoded output component based on a result of the wavelet transform.

13. The image classification apparatus according to claim 12, wherein the first prediction unit further comprises:

a first prediction convolutional network, configured to receive the first encoding unit input component and the second encoding unit input component as an input and generate a first prediction feature and a second prediction feature;

a first subtraction unit, configured to perform a subtraction operation on the third encoding unit input component and the first prediction feature to obtain a first difference feature, and perform a subtraction operation on the fourth encoding unit input component and the second prediction feature to obtain a second difference feature;

the first update unit further comprises:

a first update convolutional network, configured to receive the first different feature and the second difference feature as an input and generate a first update feature and a second update feature;

a first adding unit, configured to perform an adding operation on the first encoding unit input component and the first update feature to obtain a first adding feature, and perform an adding operation on the second encoding unit input component and the second update feature to obtain a second adding feature.

14. The image classification apparatus according to claim 13, wherein the first wavelet transform unit further comprises:

a second prediction convolutional network, configured to receive the first adding feature as an input and generate a third prediction feature;

a second subtraction unit, configured to perform a subtraction operation on the second adding feature and the third prediction feature to obtain the second encoded output component;

a second update convolutional network, configured to receive the second encoded output component as an input and generate a third update feature;

a second adding unit, configured to perform an adding operation on the first adding feature and the third update feature to obtain the first encoded output component.

15. The image classification apparatus according to claim 13, wherein the second wavelet transform unit further comprises:

a third prediction convolutional network, configured to receive the first difference feature as an input, and generate a fourth prediction feature;

a third subtraction unit, configured to perform a subtraction operation on the second difference feature and the fourth prediction feature to obtain the fourth encoded output component;
a third update convolutional network, configured to receive the fourth encoded output component as an input, and generate a fourth update feature;
a third adding unit, configured to perform an adding operation on the first difference feature and the fourth update feature to obtain the third encoded output component.

16. An image processor, comprising:
an image encoding apparatus, the image encoding apparatus including:
an encoding unit input terminal, configured to receive an input image;
n stages of encoding units connected in cascades, configured to perform image encoding on the input image to produce an output image, wherein n is an integer greater than 1, and wherein as for $1 \leq i < n$, an input of an i-th stage of encoding unit is an i-th stage of encoding unit input image and comprises $m^{i-1}$ image components, an output of the i-th stage of encoding unit is an i-th stage of encoding unit output image and comprises $m^i$ image components, and the output of the i-th stage of encoding unit is an input of an (i+1)-th stage of encoding unit, wherein m is an integer greater than 1;
an encoded output terminal, configured to output the output image, wherein the output image comprises $m''$ output sub-images, the $m''$ output sub-images are corresponding to $m''$ output image components of an n-th stage of encoding unit, and each of the $m''$ output sub-images is corresponding to an image category;
an image decoding apparatus, the image decoding apparatus including:
a decoded input terminal, configured to receive a decoded input image, the decoded input image including $m''$ image components, wherein m is an integer greater than 1, and n is an integer greater than 1;
n stages of decoding units connected in cascades, configured to perform image decoding on the decoded input image to produce a restoration image, wherein n is an integer greater than 1, and wherein as for $1 \leq i < n$, an input of an i-th stage of decoding unit is an i-th stage of decoded input image and comprises $m^{i-1}$ image components, an output of the i-th stage of decoding unit is an i-th stage of decoded output image and comprises a image components, and the output of the i-th stage of decoding unit is an input of an (i+1)-th stage of decoding unit;
a decoded output terminal, configured to output a restoration image corresponding to the decoded input image.

17. A training method used for the image processer according to claim 16, comprising:
inputting a training image to the image processor, adjusting weight values of respective convolutional networks in respective convolutional layers in the n stages of decoding unit and the n stages of decoding units, and running a limited number of iterations so as to optimize a target function.

18. An image conversion method, comprising:
receiving a first input image and a second input image;
performing image encoding on the first input image by utilizing n stages of encoding units connected in cascades to produce a first output image, wherein n is an integer greater than 1, and wherein as for $1 \leq i < n$, an input of an i-th stage of encoding unit is an i-th stage of encoding unit input image and includes $m^{i1}$ image components, an output of the i-th stage of encoding unit is an i-th stage of encoding unit output image and includes $m^i$ image components, and the output of the i-th stage of encoding unit is an input of an (i+1)-th stage of encoding unit, wherein m is an integer greater than 1;
outputting a first output image, the first output image comprising $m''$ output sub-images, wherein the $m''$ output sub-images are corresponding to $m''$ output image components of an n-th stage of encoding unit respectively, and each of the $m''$ output sub-images is corresponding to an image category;
acquiring a pixel value of each of the $m''$ output sub-images in the first output image, and comparing a sum of pixel values of respective pixels in each sub-image among the $m''$ output sub-images with a first threshold, determining an output sub-image having a sum of pixel values greater than the first threshold as a category sub-image, and outputting a category tag corresponding to the category sub-image, wherein the category sub-image comprises pixel information corresponding to the category tag in the first input image;
determining that a category of the first input image is an image category corresponding to the category sub-image;
acquiring pixel information of the category sub-image;
performing an image transform on the second input image based on the pixel information of the category sub-image, and transforming the second input image into a third image corresponding to the image category of the first input image.

* * * * *